United States Patent
Wires et al.

(10) Patent No.: US 10,952,222 B1
(45) Date of Patent: Mar. 16, 2021

(54) ISOLATED AND FLEXIBLE NETWORK DATA TRANSMISSION BETWEEN COMPUTING INFRASTRUCTURE COLLECTIONS

(71) Applicant: Amazon Technologies, Inc., Seattle, WA (US)

(72) Inventors: Jacob Wires, Vancouver (CA); Yuri Zarubin, Vancouver (CA); Leon Thrane, Issaquah, WA (US); Valeri Atamaniouk, Vancouver (CA); Julien Mascart, Vancouver (CA); Nikolaos Koutsikos Tsatsalmas, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 87 days.

(21) Appl. No.: 16/438,083

(22) Filed: Jun. 11, 2019

(51) Int. Cl.
*H04W 72/04* (2009.01)
*H04L 12/911* (2013.01)
*H04W 72/12* (2009.01)

(52) U.S. Cl.
CPC ........ *H04W 72/0493* (2013.01); *H04L 47/72* (2013.01); *H04L 47/822* (2013.01); *H04L 47/827* (2013.01); *H04L 47/828* (2013.01); *H04W 72/1268* (2013.01)

(58) Field of Classification Search
None
See application file for complete search history.

(56) References Cited

U.S. PATENT DOCUMENTS

| 8,693,327 | B2 | 4/2014 | Carter et al. |
| 2003/0179767 | A1 | 9/2003 | Kloth et al. |
| 2007/0179999 | A1* | 8/2007 | Kamei ................ G06F 11/1464 |
| 2012/0054477 | A1* | 3/2012 | Lubars ................ G06F 11/1464 713/2 |
| 2013/0174172 | A1* | 7/2013 | Naga .................... G06F 9/4881 718/103 |
| 2016/0306822 | A1* | 10/2016 | Waghulde ........... G06F 12/0246 |
| 2016/0352587 | A1* | 12/2016 | Astigarraga ............ H04L 43/16 |
| 2016/0359968 | A1* | 12/2016 | Chitti .................. H04L 41/0896 |
| 2019/0394284 | A1* | 12/2019 | Baghel .................... H04L 67/16 |

(Continued)

*Primary Examiner* — Gregory B Sefcheck
*Assistant Examiner* — Amarnauth G Persaud
(74) *Attorney, Agent, or Firm* — Robert C. Kowert; Kowert, Hood, Munyon, Rankin & Goetzel, P.C.

(57) ABSTRACT

A data transport service of a provider network provide isolated and flexible network data transmission between different computing infrastructure collections of the provider network (e.g., between different geographical regions) for different users. The data transport service may receive a request from a user for assignment of a channel. The request specifies a desired capacity of the channel to transmit data from a computing infrastructure collection to another a computing infrastructure collection. Based on the requested capacity for the channel, the data transport service may reserve, for the channel, network resource capacity to transmit the data between the infrastructures and reserve, for the channel, compute instance capacity to ingest the data and to send the data between the infrastructures using the reserved network resource capacity. The reserved network resource capacity and reserved compute instance capacity are dedicated to the channel and are unavailable for use by other channels.

20 Claims, 11 Drawing Sheets

(56) References Cited

U.S. PATENT DOCUMENTS

2020/0012659 A1* 1/2020 Dageville ............. G06F 16/245
2020/0019479 A1* 1/2020 Liu ..................... G06F 9/45558
2020/0334113 A1* 10/2020 Sanakkayala ........... H04L 43/10

* cited by examiner

ISOLATED AND FLEXIBLE NETWORK DATA TRANSMISSION BETWEEN COMPUTING INFRASTRUCTURE COLLECTIONS

BACKGROUND

Service providers may offer various online services to clients around the globe by using an extensive provider network. Therefore, provider networks may include many different data centers located in different regions around the world to provide services efficiently at a local level. For various reasons, a service located at a data center in one region may need to transfer a large amount of data to a data center in another region. For example, a client may copy data from one region to one or more other regions to maintain backups of the data.

Some clients may require hard bounds on replication delay between regions (e.g., the time between writing data to a source in one region and copying the data to a destination in another region). For example, a particular client may require the replication delay to be an hour or less for regulatory compliance or to maintain business continuity in case of a failure at the source region. The available bandwidth for transmitting data within a given region typically far outstrips the available bandwidth for transmitting data between regions. Moreover, many different clients may be competing for cross-region bandwidth at any given time. Therefore, it may be difficult to meet the replication delay requirements for multiple clients at once. Consequently, some clients may not meet their replication and backup requirements.

Figure 1:
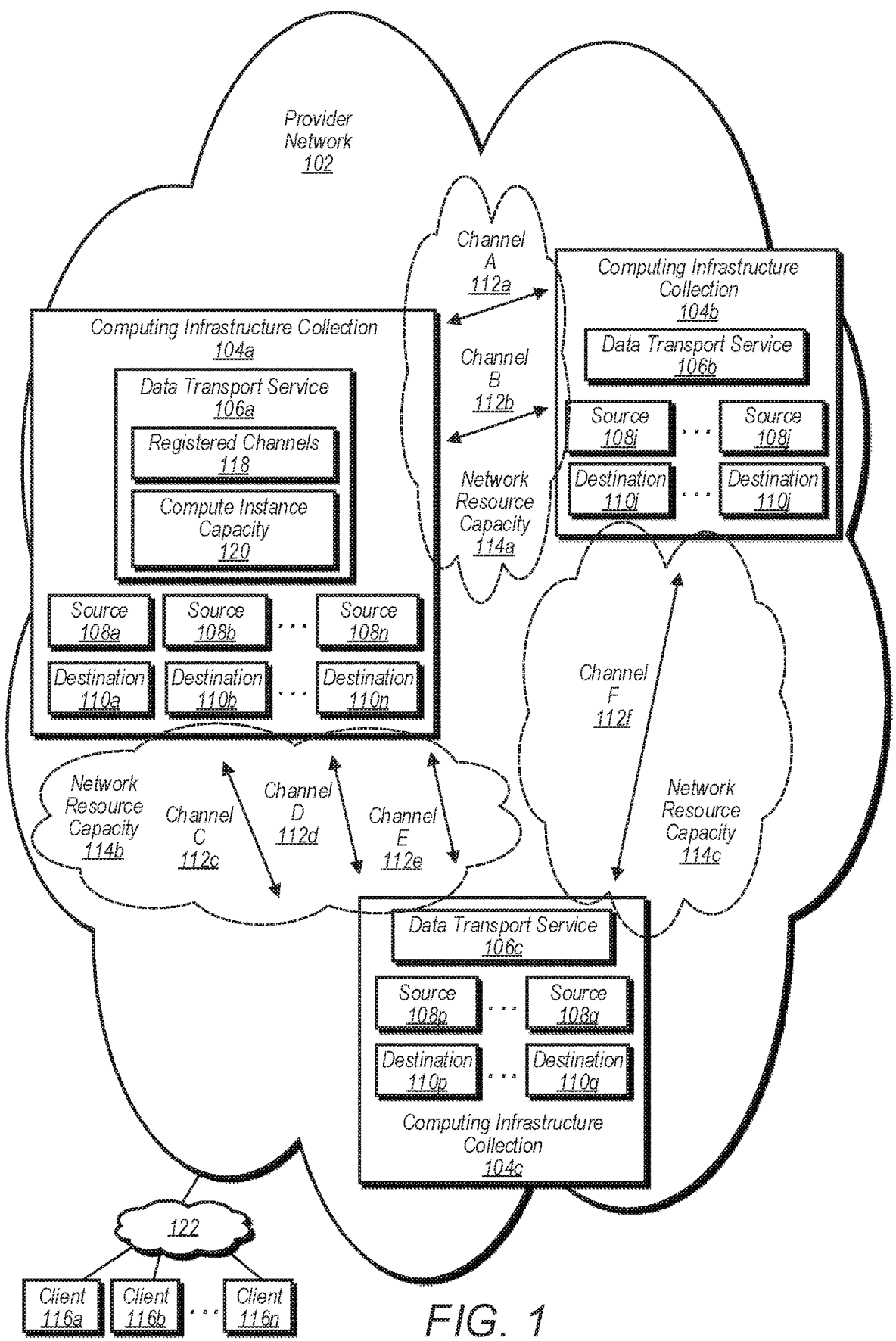
FIG. 1 illustrates a system for isolated and flexible network data transmission between computing infrastructure collections for multiple users, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for isolated and flexible network data transmission between computing infrastructure collections of a provider network (e.g., between data centers located in different geographical regions) for multiple users of a data transport service of a provider network. In embodiments, a computing infrastructure collection may be a physical location-based grouping and/or logical grouping of computing devices, where the computing devices are physically and/or logically separate from one or more other groups of computing devices that may each also be grouped according to physical location-based grouping and/or logical grouping. For example, one computing infrastructure collection may be a network of computing devices (e.g., servers, routers, etc.) within a geographical area (e.g., city, county, state, country, continent, etc.) and another computing infrastructure collection may be another network of computing devices (e.g., servers, routers, etc.) within a different geographical area (e.g., a different city, county, state, country, continent, etc.).

In some embodiments, the computing devices of a computing infrastructure collection may belong to a local network and the computing devices of another computing infrastructure collection may belong to a remote network (e.g., with respect to the local network). For example, a data center located in a city or region of the U.S. (e.g., servers and/or other computing devices that belong to the same local network of the U.S. data center) may be considered a computing infrastructure collection and another data center located in a city or region of Canada (e.g., servers and other computing devices that belong to the same local network of the Canada data center) may be considered another computing infrastructure collection. In embodiments, any country, continent or other area (e.g., regions, cities, metropolitan areas, etc.) may be divided into any number of geographical areas, and each of those geographical areas may include any number of computing infrastructure collections.

In embodiments, available bandwidth for transmitting data between two devices within the same computing infrastructure collection (e.g., from one server to another server within the same data center and/or local network) is greater than the available bandwidth for transmitting data between two different computing infrastructure collections of a provider network (e.g., using a backbone network of the provider network to transmit data from a server within one data center and/or local network to another server within a different data center and/or local network). Therefore, multiple users of a provider network may compete for a relatively limited amount of available bandwidth between different computing infrastructure collections. This may result in some users taking away network resource capacity and/or compute capacity from other users. As a result, transmission performance for other users is negatively impacted by reducing available bandwidth and increasing the amount of time required to transmit a given amount of data between different computing infrastructure collections (also known as the "noisy neighbor" problem). As used herein, the term "infrastructure" refers to a computing infrastructure collection.

Various embodiments provide the ability to transmit data between infrastructures using user-dedicated channels that isolate transmission performance of one user from transmission performance of data transmissions of other users. By enabling multiple competing users to utilize different amounts of network resource capacity and compute capacity through different dedicated channels, the noisy neighbor problem may be reduced or eliminated. This may result in improved transmission performance and more predictable data replication timelines.

In some embodiments, a data transport service of a provider network may receive requests from different users and each request may be for assignment of a respective channel for transmission of data between different infrastructures. For example, a given request from a given user may be for assignment to the user of a channel for transmission of data between a source (e.g., a database or other data store) within an infrastructure of the provider network (e.g., a data center in Italy) and a destination (e.g., a database or other data store) within another infrastructure of the provider network (e.g., a data center in Canada). Another request from a different user may be for assignment of a channel between a data center in Italy a data center in France. An additional request from an additional user may be for assignment of a channel between a data center in Germany and a data center in Japan.

In embodiments, a given request may specify a requested capacity of the channel to transmit data between a source in an infrastructure and a destination in another infrastructure. In embodiments, even though a request may specify a source and a destination, the data transport service may consider the requested capacity to be the requested capacity for the data transmission that occurs between the infrastructures (e.g., from a transmitting endpoint or node of one infrastructure to a receiving endpoint or node of the other infrastructure).

In various embodiments, the available capacity to transmit data between two different infrastructures may be much smaller than the available capacity to transmit data within the same infrastructure (e.g., from the source to the transmitting endpoint/node or from the receiving endpoint/node to a destination). Therefore, in embodiments, the data transport service may reserve resources for a channel (e.g., network resource capacity and/or compute instance capacity) for transmitting data between the transmitting endpoints/nodes based on the requested capacity for the channel, while allowing data transmission within the same infrastructure to occur at a higher (or lower) capacity (e.g., independent of the capacity for transmitting data between the transmitting endpoints/nodes of the infrastructures).

In embodiments, the requested capacity of a channel may be specified as one or more of: an amount of time between when data (e.g., of a certain size) is written to the infrastructure (e.g., at the source) and when the data is copied and/or transmitted (for replication/backup purposes) to the other infrastructure (e.g., to the destination) (a "recovery point objective," or a deadline/time window for an amount of data is to be transmitted from the source within the infrastructure to the destination within the other infrastructure using the channel), a rate of transmitting data from the first computing infrastructure collection (e.g., from the source or the endpoint/node of the infrastructure) to the second computing infrastructure collection (e.g., to the destination or the endpoint/node of the other infrastructure) ("bandwidth" or bytes per second), or a rate of transmitting transactions from the infrastructure to the other infrastructure (transactions per second or "TPS"). Therefore, a user may submit a request specifies a desired recovery point objective, a desired bandwidth, and/or a desired TPS. In some embodiments, the data transport service will determine the desired bandwidth and/or the desired TPS based on the recovery point objective specified by the user (e.g., based on calculating the minimum necessary bandwidth and/or the TPS required to meet the recovery point objective).

For a given request, the data delivery service may assign a particular channel (e.g., to the user that submitted the request or to another user). Based on the requested capacity for the particular channel, the data transport service may reserve, for the particular channel, network resource capacity to transmit the data between the infrastructure and the other infrastructure. In embodiments, the network resource capacity reserved for the particular channel is less than a total amount of network resource capacity available to the data transport service to transmit data between the infrastructure and the other infrastructure (e.g., a portion that is less than the total amount of network resource capacity available). In some embodiments, the network resource capacity reserved for the particular channel may be the total amount of network resource capacity available to the data transport service to transmit data between the infrastructure and the other infrastructure (e.g., for at least a period of time, until some of the total amount of network resource capacity available is reserved for one or more other new and/or existing channels). Thus, the data transport service may be allocated a maximum amount of network resource capacity that can be reserved at any given time and/or that can be used at any given time to transmit data between the infrastructure and the other infrastructure (e.g., by one or more channels and/or other components of the data transport service).

In embodiments, any suitable techniques may be implemented in order to reserve network resource capacity for a particular channel (e.g., for transmitting data using network resources that are dedicated to the user's particular channel). For example, utilization of hardware and/or software network resources by other channels and/or components of the data transport service to transmit data between the infrastructure and another infrastructure may be limited by a sufficient amount such that the particular channel may be used at any time to transmit data between the infrastructure and the infrastructure at (or up to) the requested capacity for the particular channel (e.g., the requested recovery point objective, bandwidth, and/or TPS). In other words, a certain portion of the total amount of network resource capacity (e.g., utilization) available to the data transport service to transmit data between the infrastructure and the other infrastructure (e.g., using routers, switches, and/or other hardware/software components) may be withheld from use by other channels and/or components of the data transport system and available for exclusive use to the particular channel (e.g., dedicated to the particular channel).

Based on the requested capacity for the particular channel, the data transport service may also reserve, for the particular channel, compute instance capacity to ingest the data from the specified source and/or to send the data to the specified destination using the reserved network resource capacity (e.g., reserve a sufficient amount of compute instance capacity to be used in conjunction with the reserved network resource capacity such that the particular channel may transmit data at (or up to) the requested capacity). In embodiments, the compute instance capacity reserved for the particular channel is less than a total amount of compute instance capacity available to the data transport service for ingesting data from sources and/or for sending data from the infrastructure to the other infrastructure and/or additional infrastructures (e.g., a portion that is less than the total amount of compute instance capacity available). In some embodiments, the compute instance capacity reserved for the particular channel may be the total amount of compute instance capacity available to the data transport service for ingesting data from sources and/or for sending data from the infrastructure to the other infrastructure and/or additional infrastructures (e.g., for at least a period of time, until some of the total amount of compute instance capacity available is reserved for one or more other new and/or existing channels). Thus, the data transport service may be allocated a maximum amount of compute instance capacity that can be reserved at any given time and/or that can be used at any given time to ingest data from sources and/or to send data from the infrastructure to the other infrastructure and/or additional infrastructures (e.g., by one or more channels and/or other components of the data transport service).

In embodiments, any suitable techniques may be implemented in order to reserve compute instance capacity for a particular channel (e.g., for ingesting data from a specified source and/or for sending data to a specified destination using compute instance resources dedicated to the user's particular channel). For example, utilization of hardware and/or software compute resources (e.g., instance hosts and/or compute instances running on instance hosts of the data transport service) by other channels and/or components of the data transport service to ingest data from a specified source and/or to send data to a specified destination may be limited by a sufficient amount such that the particular channel may be used at any time to transmit data between the infrastructure and the infrastructure at (or up to) the requested capacity for the particular channel (e.g., the requested recovery point objective, bandwidth, and/or TPS). In other words, a certain portion of the total amount of compute instance capacity (e.g., utilization) available to the data transport service to ingest data and/or to transmit data between the infrastructure and the other infrastructure (e.g., using instance hosts and/or compute instances running on instance hosts) may be withheld from use by other channels and/or components of the data transport system and available for exclusive use to the particular channel (e.g., dedicated to the particular channel).

In embodiments, any suitable security communication protocols may be used to protect data that is being sent between any devices and/or networks (e.g., provider network, client network, backbone network, cellular networks, etc.). For example, data may be encrypted using SSL (secure socket layer), TLS (transport layer security), HTTPS (secure hypertext transfer protocol), and/or any other suitable network security protocol.

FIG. 1 illustrates a system for isolated and flexible network data transmission between computing infrastructure collections for multiple users, according to some embodiments. In embodiments, the provider network 102, the infrastructures 104, and any other components depicted in FIG. 1 may be the same as or include one or more of the same components as the provider network, infrastructures, and any other components depicted in any of FIGS. 2-10. As discussed above, available bandwidth for transmitting data between two devices within the same infrastructure (e.g., from one server to another server) may be greater than the available bandwidth for transmitting data between two different infrastructures (e.g., from infrastructure 104a to infrastructure 104b or 104c).

In the illustrative embodiment, a service provider's network 102 may include multiple different infrastructures 104. Each infrastructure 104 of the provider network may include an instance of a data transport service 106, any number of sources 108 of data, and any number of destinations 110 of data. In embodiments, any of the sources 108 and/or destinations 110 of data may be within another service of the provider network. For example, the source 108a may be within a relational database service and the source 108b may be within an object storage service.

As shown, different channels 112 are assigned for use by different users to transmit data between different infrastructures. The data transport service 106 may reserve a portion of network resource capacity 114 between two infrastructures to transmit data between the two infrastructures using a channel (e.g., on behalf of the user assigned to use the channel). For example, the data transport service 106 may reserve a portion of the network resource capacity 114a between infrastructures 104a and 104b to transmit data between infrastructures 104a and 104b using the channel 112a on behalf of a user at a remote client 116 (e.g., an administrator or software application at a remote client network) that is assigned to use the channel 112a or on behalf of user within the provider network 102 (e.g., a data storage service) that is assigned to use the channel 112a.

As depicted, the data transport service 106 includes registered channels 118, which may be a registry that includes metadata describing various aspects of the channels that are currently assigned for use by users of the data transport service 106. The metadata may be used by a control plane component (e.g., channel manager of FIG. 2) to perform various configuration and management operations for the channels 112 and other aspects of the data transport service 106.

The data transport service 106 also includes compute instance capacity 120. The data transport service 106 may reserve a portion of the compute instance capacity 120 to ingest data from a specified source and to send the data to a specified destination a portion of network resource capacity that has been reserved for a channel (e.g., on behalf of the user assigned to use the channel). For example, the data transport service 106 may reserve a portion of the compute capacity 120a at the data transport service 106a to ingest data from the source 108a and to send the data to the destination 110i using a portion of the network resource capacity 114a that has been reserved for the channel 112a using the channel 112a on behalf of a user at a remote client 116 that is assigned to use the channel 112a.

In embodiments, some or all of the hardware and/or software resources that provide the network capacity 114 between any two infrastructures are managed and/or owned by the provider network and/or some or all of the hardware and/or software resources that provide the network capacity 114 between any two infrastructures may be available for public use, leased, or shared with other entities (e.g., a backbone network of the provider network, portions of the internet, etc.).

In embodiments, any number of external client networks 116 may use any of the services of the provider network 102 by communicating with the provider network 102 via a wide area network 122 (e.g., the internet). For example, a remote client 116*a* may send, via the wide area network 122, a request for assignment of a channel 112 for use by a user at the client 116*a*. As described herein, the data transport service 106 may then register/assign the channel for the user, reserve network resource capacity and compute instance capacity for the channel, make the channel available for sending data between two infrastructures, and begin sending data between the two infrastructures using the channel (e.g., via an ingestion layer, admission control layer, and/or a transport layer, as described herein). As described herein, the data transport service 106 at the source infrastructure may receive acknowledgments and/or other status messages associated with data transmission from the data transport service 106 at the destination infrastructure.

Figure 2:
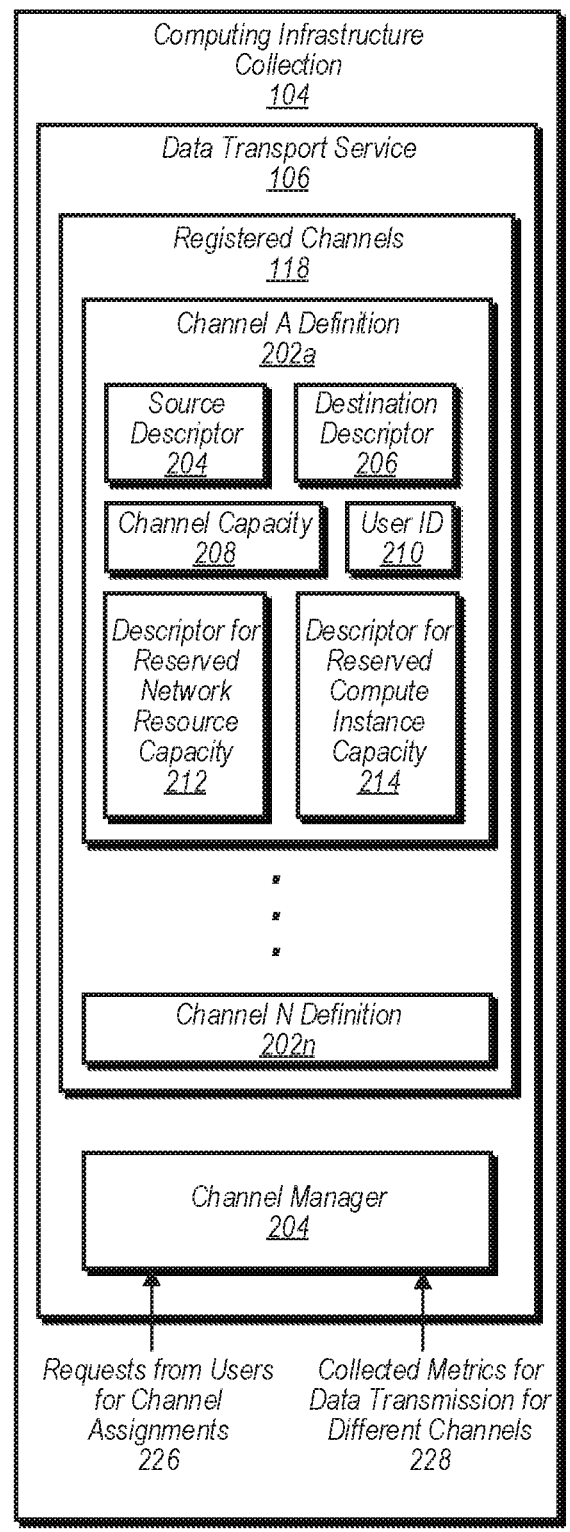
FIG. 2 is a block diagram of a data transport service that implements isolated and flexible network data transmission between computing infrastructure collections for multiple users, according to some embodiments.

FIG. 2 is a block diagram of a data transport service that implements isolated and flexible network data transmission between computing infrastructure collections for multiple users, according to some embodiments. In the depicted embodiment, the data transport service 106 includes channel definitions 202 for different registered channels 118 and a channel manager 204.

In embodiments, the channel manager 204 may perform various control-plane operations of the data transport service (e.g., registering/assigning channels, reserving network resource capacity and compute instance capacity, etc.). The channel manager 204 may also include a management interface for receiving requests from users for assignment of channels (e.g., via application programming interfaces), providing acknowledgement to users of successful channel assignment, and/or for receiving configuration instructions from system administrators to configure various aspects of the data transport service (e.g., identifying/configuring/changing the total network capacity and/or the total compute capacity available to the data transport service).

As depicted, the channel definition 202*a* for a channel may include a source descriptor 204, a destination descriptor 206, a channel capacity 208, a user ID 210, a descriptor for reserved network resource capacity 212 for the channel, and a descriptor for reserved compute instance capacity 214 for the channel. The source descriptor 204 may indicate a location (e.g., a network address or other identifier) that is usable by the data transport service to locate the source of the data for the channel and/or to ingest data for the channel (e.g., to copy, stream, and/or replicate data from the source to a destination).

The destination descriptor 204 may indicate a location (e.g., a network address or other identifier) that is usable by the data transport service to locate the destination of the data for the channel and/or to send data for the channel (e.g., to copy, stream, and/or replicate data from the source to a destination). The channel capacity 208 may indicate the requested capacity of the channel (e.g., the capacity that is assigned to the channel based on the request). In embodiments, the channel capacity may indicate a desired recovery point objective, a desired bandwidth, and/or a desired TPS.

The User ID 210 may indicate an identifier that uniquely identifies the user (e.g., with respect to other users) that the channel is assigned to for transmission of data. The descriptor for reserved network resource capacity 212 may indicate an amount of network resource capacity currently reserved for the channel and/or the particular hardware and/or software resources that are currently reserved (at least in part) for use by the channel. The descriptor for reserved compute instance capacity 214 may indicate an amount of compute instance capacity currently reserved for the channel and/or the particular instance hosts and/or compute instances running on instance hosts that are currently reserved (at least in part) for use by the channel.

As shown, the channel manager 204 may receive metrics (e.g., collected over a period of time by the data transport service 106) for data transmission for any number of channels that are transmitting and/or have transmitted data between infrastructures. In embodiments, the metrics may include information about pending data transfers (or historical transfer data) for any or all of the registered channels and based on that information, predict an amount of capacity required for one or more channels. As described for FIG. 10, these metrics may be used by the data transport service to provide auto-scaling capability (e.g., based on changes in the rate/amount of data transmission using the channel over the period of time).

Figure 3:
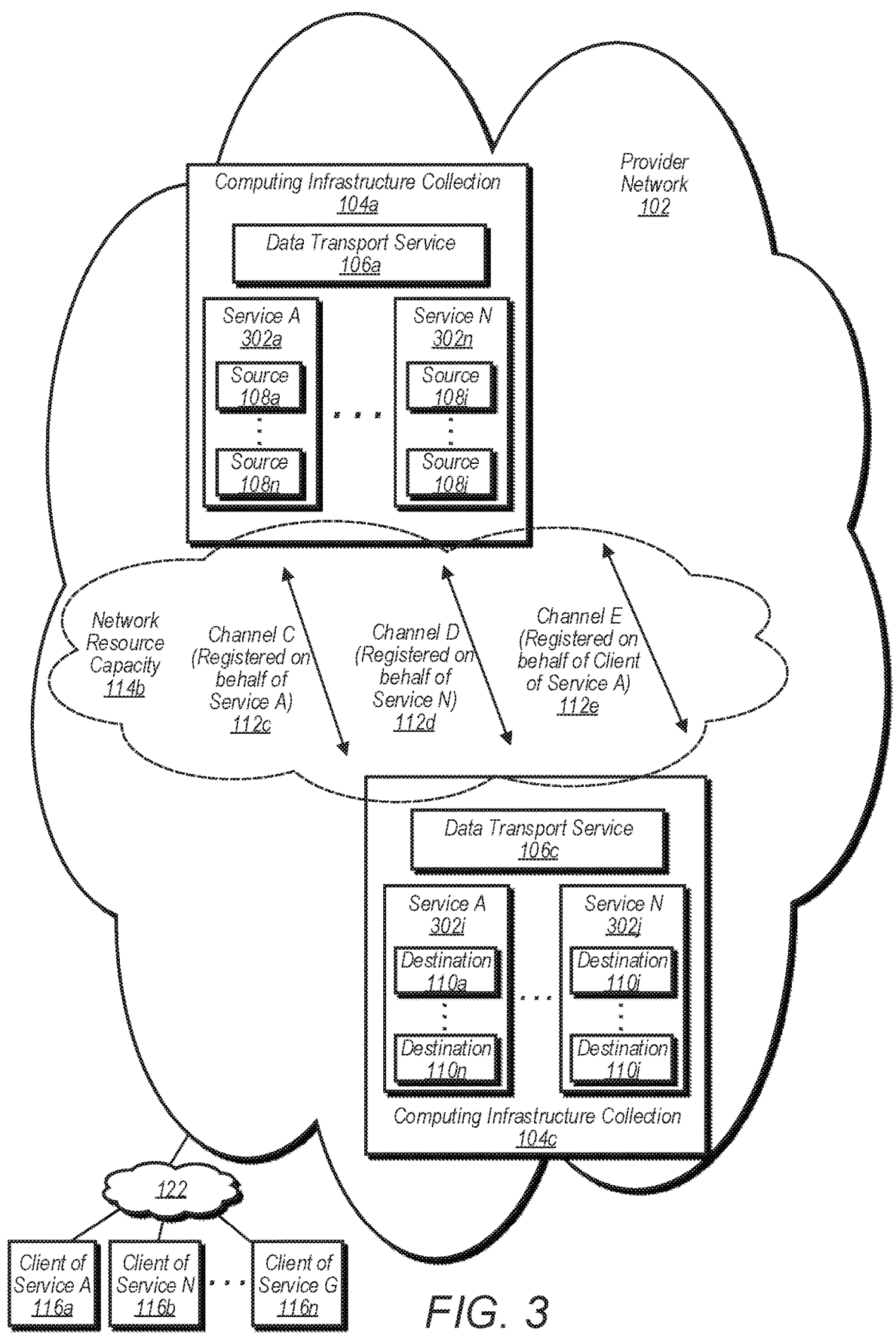
FIG. 3 illustrates a system for isolated and flexible network data transmission between computing infrastructure collections for multiple users, according to some embodiments.

FIG. 3 illustrates a system for isolated and flexible network data transmission between computing infrastructure collections for multiple users, according to some embodiments. In embodiments, the infrastructures 104*a*, 104*c* and channels 112*c*-112*d* may be example embodiments of the corresponding infrastructures and channels of FIG. 1.

Each infrastructure 104 of the provider network includes an instance of a data transport service 106 and any number of sources and/or destinations of data (e.g., within any number of service instances). In the depicted example, services 302*a*-302*n* include sources 108*a*-108*n* and 108*i*-108*j* of data, any of which may be a source of data that is transmitted to one of the destinations of one or more other infrastructures, such as the destinations 110*a*-110*n* and 110*i*-110*j* in other instances of service A and service N. For example, service 302*a* may store data for users in a relational database format and service 302*n* may data for users in a different format (e.g., object storage or file storage). Although not shown, any of the services of the infrastructure 104*c* may include any number of sources of data that correspond to any number of destinations within any of the services of infrastructure 104*a*.

As shown, different channels 112 are assigned for use by different types of users of the data transport service 106 to transmit data between different infrastructures. The data transport service 106 may register channel C 112*c* on behalf of service A 302*a*. In embodiments, this may include assigning channel C 112*c* for use by service A (the user) to transmit data between infrastructures 104*a* and 104*c* (e.g., on behalf of any number of internal and/or external clients of service A). In embodiments, a system administrator for service A may send a request (e.g., specifying a requested capacity) to the data transport service for assignment of a channel for transmission of data between the infrastructures 104*a*, 104*c* and in response, the data transport service 106 may register channel C 112*c* for use by service A and perform any necessary configuration operations as described herein (e.g., reserving network resource capacity, compute instance capacity, etc.) to make channel C dedicated for use by service A and available to transmit data on behalf of service A between the infrastructures 104a, 104c (e.g., from a source in service A 302a to a destination in service P 302p).

In the example embodiment, the same or similar process as described above may be performed to register channel D 112d on behalf of service N 302n to make channel D available to transmit data on behalf of service N between the infrastructures 104a, 104c (e.g., from a source in service N 302n to a destination in another instance of service N 302j). In embodiments, any number of channels may be configured and used by external users of the data transport service 106 to transfer data on behalf of external clients of the data transport service and/or another service of the provider network (e.g., in the same or similar process as described above for the internal clients service A and service N).

In the depicted example, the data transport service 106 may register channel E 112c on behalf of client 116a of service A 302a (e.g., a remote user at a remote client network that uses service A to store data). In embodiments, this may include assigning channel E 112e for use by the remote user to transmit data from a source within service A 302a of infrastructure 104a to a destination within another instance of service A 302i of infrastructure 104c. In an embodiments, service instances 302a and 302i may be different instances of the same storage service (e.g., a relational database service). In embodiments, a remote system administrator for service A (or the remote user) may send a request (e.g., specifying a requested capacity) to the data transport service for assignment of a channel for transmission of data between the service A 302a and service A 302i and in response, the data transport service 106 may register channel E 112c for use by service A and perform any necessary configuration operations as described herein (e.g., reserving network resource capacity, compute instance capacity, etc.) to make channel E dedicated for use by the client 116a and available to transmit data on behalf of the client 116a of service A between service A 302a and service A 302i (e.g., from a source in service A 302a to a destination in service A 302i).

In embodiments, the data transport service 106 may register a channel on behalf of an external client (e.g., client 116n). Therefore, an external client may be the user or owned entirely by the client. Therefore, the external client may not be a client of another service of the provider network. Instead, the external client may have one or more channels registered on behalf of the external client for use by the client. For example, the client may have data source(s) at its local network and/or data source(s) at the provider network, and the client may use the data transport service to transmit data from those source(s) to another infrastructure using one or more registered channels.

Figure 4:
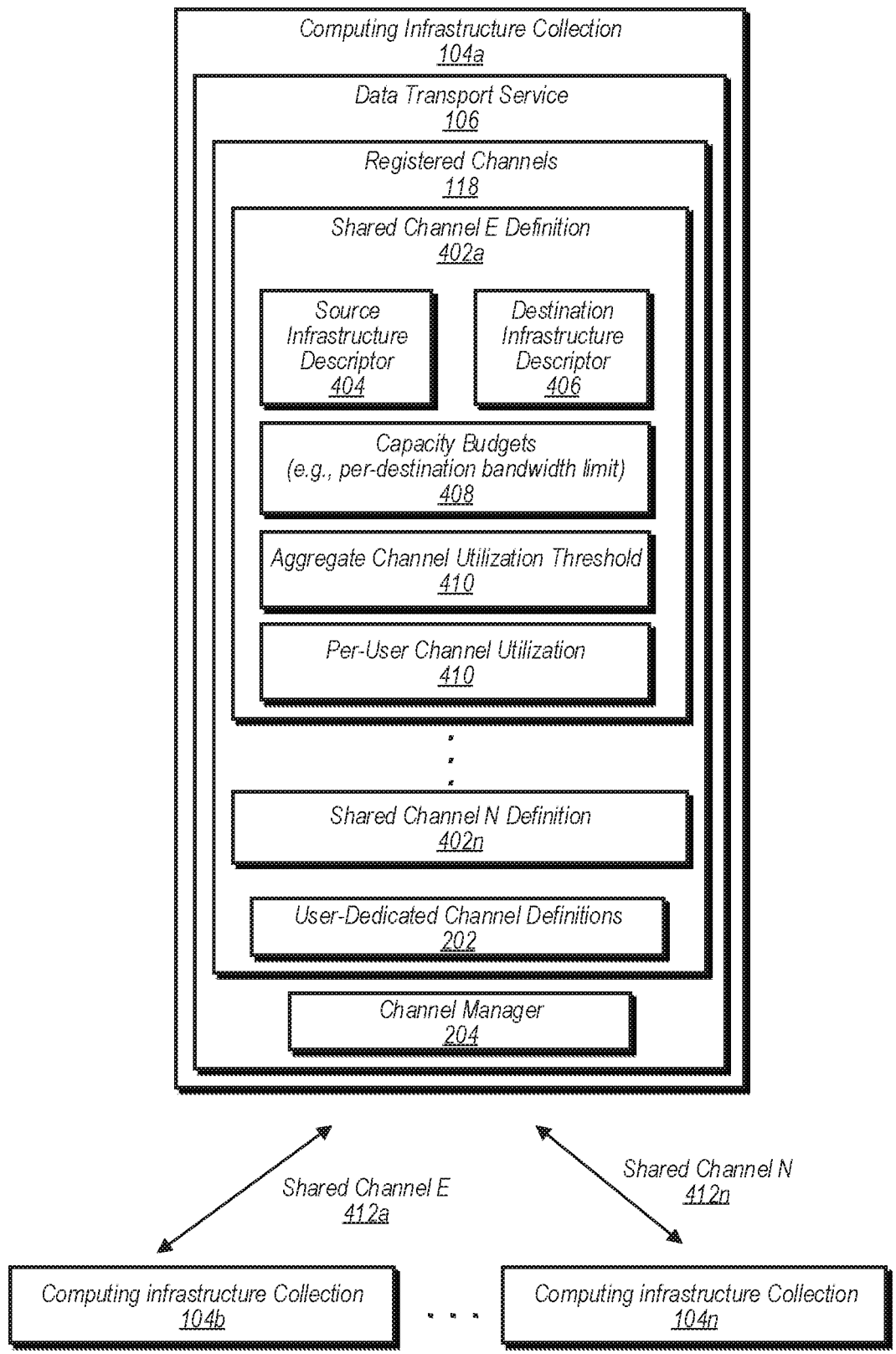
FIG. 4 is a block diagram of a data transport service that implements isolated and flexible network data transmission between computing infrastructure collections for multiple users using dedicated channels or a shared channel, according to some embodiments.

FIG. 4 is a block diagram of a data transport service that implements isolated and flexible network data transmission between computing infrastructure collections for multiple users using dedicated channels or a shared channel, according to some embodiments. In the depicted embodiment, the data transport service 106 includes shared channel definitions 402 for different shared channels between the infrastructure 104a and other infrastructures 104b-104n, one or more user-dedicated channel definitions 202 (e.g., channel definitions 202 of FIG. 2), and a channel manager 204.

As described for FIG. 2, the channel manager 204 may perform various control-plane operations of the data transport service (e.g., registering/assigning channels, reserving network and compute capacities, etc.), which may include the same or similar operations required to configure and implement shared channels 402 (e.g., channels that may be shared for use by multiple users). For example, the channel manager 204 may also include a management interface for receiving configuration instructions from system administrators to create, configure, and/or modify various aspects of different shared channels (e.g., configuring/changing the portion of the total network capacity and/or the portion of the total compute capacity available to the data transport service that is available and/or allocated for use by one or more users of the shared channel).

As depicted, the shared channel definition 402a for a channel may include a source infrastructure descriptor 404 for the shared channel (identifying aspects of the source infrastructure), a destination infrastructure descriptor 406 (identifying aspects of the source infrastructure), a capacity budget 408 for one or more different destinations that data is transmitted to using the shared channel (e.g., a maximum allowed capacity to send data to a destination on behalf of a user using the shared channel), and an aggregate channel utilization threshold 410. In embodiments, the capacity budget 408 and/or the aggregate channel utilization threshold 410 may specify a particular recovery point objective, a bandwidth, and/or a TPS. The shared channel definition 402a may be the descriptor that corresponds to shared channel 412a that transmits data between infrastructures 104a and 104b.

In embodiments, when the utilization of the network capacity resources and/or the compute instance resources available and/or allocated to the shared channel meets or exceeds the aggregate channel utilization threshold, then the channel manager may reduce the capacity budget for one or more of the destinations that that data is transmitted to using the shared channel (e.g., to reduce the amount of data being transmitted by the one or more users that are consuming the highest amount of the utilization of the shared channel to transmit data). This may help to prevent top offenders from harming transmission performance for other users of the shared channel.

Although the depicted embodiment shows one shared channel for transmitting data between the infrastructure 104a and any other given infrastructure 104b-104n, in some embodiments multiple shared channels may be used between the infrastructure 104a and another infrastructure 104. For example, a lower-performance shared channel (e.g., lower capacity for transmitting data) may be available for clients that do not have a need for high performance or do not wish to pay for faster data transmission, whereas a higher-performance shared channel (e.g., higher capacity for transmitting data) may be available for clients that desire faster data transmission and are therefore willing to pay for faster data transmission. In embodiments, if a client desires faster data transmission than that of the higher-performance shared channel, then the client may request assignment of a user-dedicated channel (e.g., as described for FIGS. 1-3).

In embodiments, the shared channel definition may include a per-user channel utilization 412 that may indicate an amount of capacity available to each user of the shared channel. The data transport service may apply a fairness algorithm to prevent one or more users from consuming more than a threshold amount of capacity of the shared channel. For example, a capacity budget may be assigned to some or all of the users of the shared channel (e.g., the same or different thresholds may be assigned to each user). The algorithm may prevent any user from exceeding their capacity budget. In embodiments, the fairness algorithm may reduce and/or stop transmitting data for a user for at least a period of time if the user exceeds a capacity budget assigned to the user. In some embodiments, one or more tasks for the user may be moved to a sideline queue, as described for FIG. 9.

Figure 5:
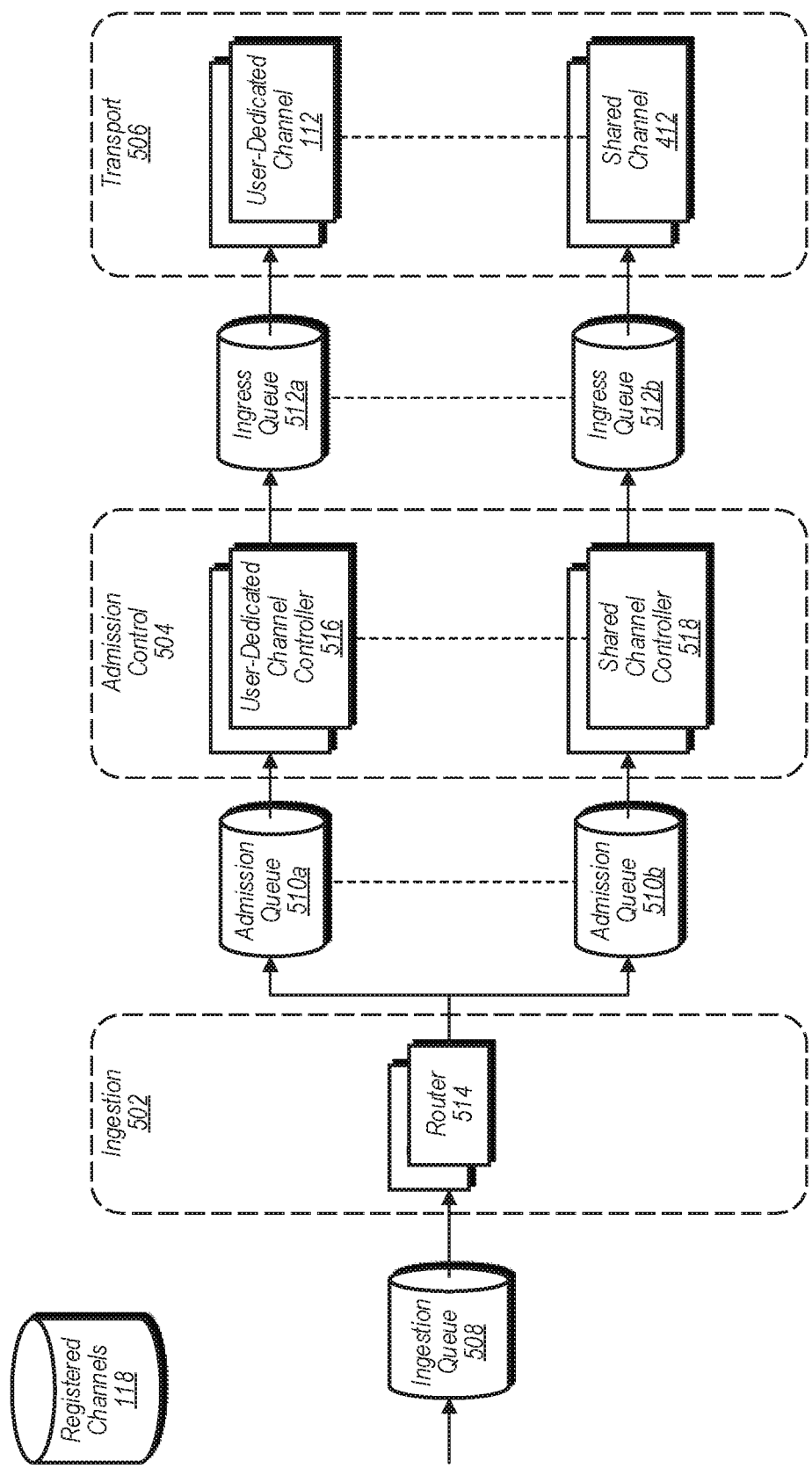
FIG. 5 is a block diagram of a data transport service that implements an ingestion layer, an admission control layer, and a transport layer, according to some embodiments.

FIG. 5 is a block diagram of a data transport service that implements an ingestion layer, an admission control layer, and a transport layer, according to some embodiments. In various embodiments, the ingestion layer 502, admission control layer 504, and transport layer 506 of FIG. 5 may include any of the components of the ingestion layer, admission control layer, and transport layer of FIG. 6 or 7. In embodiments, the ingestion queue 508 may be considered a part of the ingestion layer 502, the admission queues 510 may be considered a part of the admission control layer 504, and the ingress queues 512 may be considered a part of the transport layer 506.

In embodiments, the transport layer 506 copies objects (e.g., a portion of data in a particular format or structure) across infrastructures (e.g., for replication/backup) and the admission control layer 504 mediates access to user-dedicated channels and/or shared channels for transmitting objects. In embodiments, the ingestion layer 502 provides a streaming replication service for live traffic to allow the data transport service to replicate data streams (e.g., sequences of multiple data objects over time) from sources to destinations.

The channel manager 204 may perform various management and control operations for the data transport service. Therefore, the channel manager and/or components used for management and control operations may be referred to as a "control plane." Other components of the data transport service that perform operations on objects/data (e.g., replicating, sending data, etc.) may be referred to as a "data plane."

As used herein, the registered channels 118 may also be referred to as a "registry." The channel manager (e.g., control plane) may access and update the registry to keep track of the state of the data transport service (e.g., channel configuration, network resource capacity, compute resource capacity, etc.).

As depicted, the ingestion layer 502 includes one or more routers 514 to forward messages (e.g., messages that identify objects to be replicated) from the ingestion queue to an admission queue 510a for the user-dedicated channel controller 516 or to the admission queue 510b for the shared channel controller 518. The user-dedicated channel controller 516 forwards messages to the ingress queue 512a before they are retrieved and processed by one of the user-dedicated channels 112 in order to replicate objects to another infrastructure (e.g., from infrastructure 104a to 104c). The shared channel controller 518 forwards messages to the ingress queue 512b before they are retrieved and processed by the shared channel 412 in order to replicate objects to the other infrastructure (e.g., from infrastructure 104a to 104c).

As used herein, a user-dedicated channel may be referred to as an "RPO" channel, a user-dedicated channel controller 516 may be referred to as an "RPO" controller, a user of a user-dedicated channel may be referred to as an "RPO" user, a shared channel may be referred to as a "common channel," and a shared channel controller 518 may be referred to as a "common CRR controller" or common controller, and a user of a shared channel may be referred to as a "CRR" user.

In embodiments, external users (e.g., external clients/customers) may use the transport layer to schedule replication tasks directly. The data transport service may also support a streaming mode for replicating live traffic. This mode may be implemented by an ingestion service (e.g., within the ingestion layer). The ingestion service may consumes a stream of mutation events from a stream source.

The ingestion service presents a single ingestion queue that stores the keys of objects that have recently been modified. Ingestion threads long-poll this queue, marking items as in flight to avoid duplicate work. When a thread receives a message, it retrieves the key's replication configuration, queries the channel registry to locate the admission queue for the key's channel, forwards the message to the appropriate admission queue (e.g., user-dedicated or shared), and deletes it from the ingest queue. This service may be provided by the router 514 component in the ingestion layer.

In some embodiments, the ingress queues may be in-memory queues that are stored in memory in the transport layer and/or have a fixed capacity, whereas the admission queues and/or ingestion queue may be elastic (e.g., SQS durable queues). In other words, the admission queues and/or ingestion queue may grow to any capacity, depending on the amount of messages and/or data provided by the router.

Figure 6:
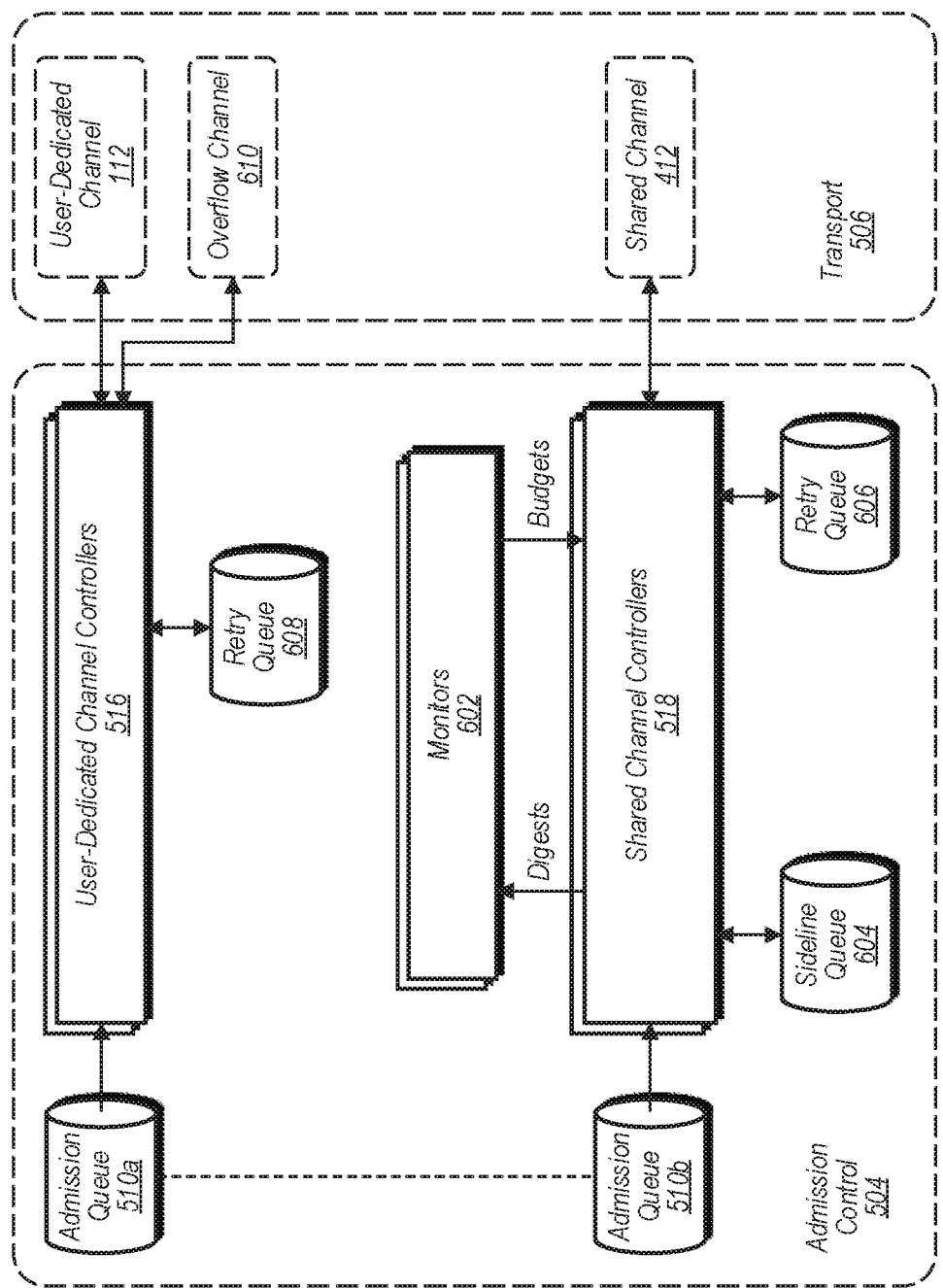
FIG. 6 is a block diagram of an admission control layer and a transport layer of a data transport service, according to some embodiments.

FIG. 6 is a block diagram of an admission control layer and a transport layer of a data transport service, according to some embodiments. In embodiments, dedicated channels provide statically allocated, strongly isolated replication resources. This is ideal for RPO users with hard replication deadlines, as well as users who desire predictable throughput. However, it may be too expensive for common CRR users who prefer best-effort service at a lower price. To address this, the data transport service may offer managed channels that can be shared by many users.

As described above, one managed channel may be provisioned for each source and destination region pair administered by the data transport service. Access to managed channels is mediated by an adaptive admission control service that is responsible for enforcing fairness among competing users. The admission control layer comprises a monitor fleet 602 and a controller fleet 518. Each managed channel is allocated an admission queue 510b, a sideline queue 604, a retry queue 606, a monitor service endpoint, and one or more controller threads. As shown, each user-dedicated channel may also be allocated a retry queue 608.

Items in an admission queue specify a single key to be replicated. Controllers long-poll their designated admission queue, collecting keys in memory and marking them as in flight to prevent other controllers from processing them. When they have accumulated enough keys (or a fixed timeout expires), they submit a replication batch to the channel's ingress queue, and long-poll the egress queue for the response. If the response indicates transfer failures, the corresponding keys are enqueued in the retry queue. Once this is done, all keys from the batch are deleted from the admission queue.

Shared channel controllers periodically send digests to the monitor service and retrieve traffic budgets. Digests provide monitors with a destination-level summary of the traffic processed by a given controller. Budgets prescribe per-destination bandwidth and TPS limits. The monitor service aggregates digests to compute a global traffic distribution for a shared channel and it records users who are the top resource consumers (e.g., a number of the users who are consuming more resources than a remainder of the users of the channel). By default, destinations may be allocated an unlimited budget. When aggregate channel utilization meets or crosses a high water mark threshold (e.g., 80%), the monitor service reduces the budget allocations for the top offenders (e.g., the top resource consumers). Controllers enforce these budgets when compiling replication batches. Replication tasks for users that exceed a destination's allotted budget are removed from replication batches and stored in the shared channel's sideline queue.

Dedicated threads poll the retry and sideline queues to resubmit failed and throttled tasks, continuing to honor budget allocations as they do so, and also taking care to prevent retry traffic from overwhelming live traffic. Admission control for RPO channels may be much simpler: monitors do not need to allocate budget for RPO users, since they have already been provisioned dedicated resources. As such, controllers will typically submit replication batches directly to RPO channels. However, they may decide to divert traffic to a common overflow channel 610 if they determine from RPO channel backlogs that incoming batches may not complete within their RPO deadline.

In some embodiments, the monitor(s) observe the backlog of work/data transfers to be performed and may communicate some or all of this information to the transport layer (e.g., to the channel manager). The channel manager may use this information to increase or decrease the capacity (e.g., the corresponding network resource capacity and/or compute instance capacity) reserved for the shared channel to transmit data. For example, if the backlog is greater than a threshold amount of work, tasks, and/or data to be transferred, then the channel manager may increase the capacity of the shared channel by at least a threshold amount.

Figure 7:
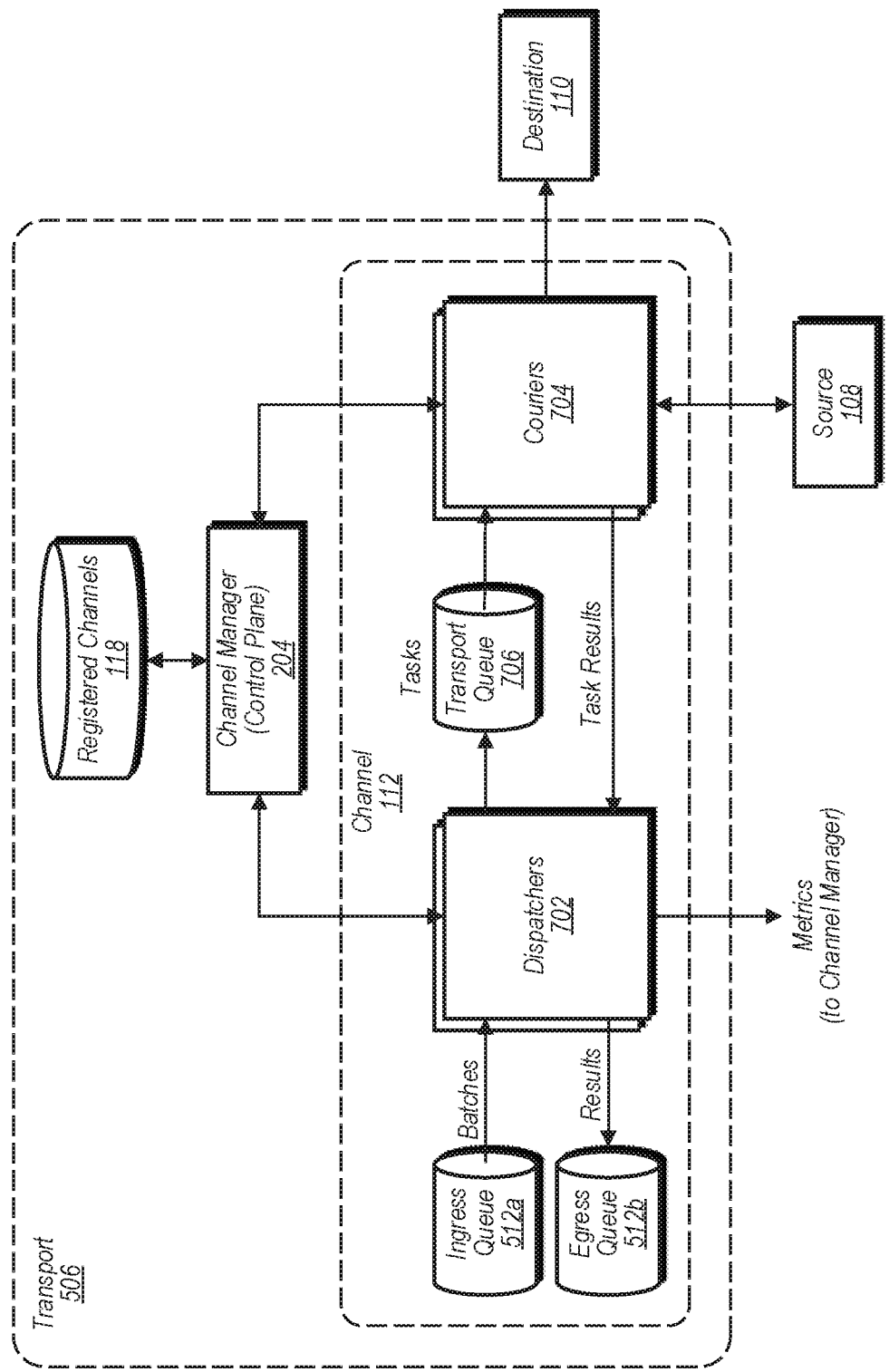
FIG. 7 is a block diagram of a transport layer of a data transport service, according to some embodiments.

FIG. 7 is a block diagram of a transport layer of a data transport service, according to some embodiments. The transport layer is responsible for copying bits across the wire. It provides a thin virtualization layer on top of the physical network resources administered by the data transport service. Its primary goals are to provide strong isolation and predictable performance for statically allocated resources.

The transport layer comprises a control plane (e.g., channel manager 204) along with dispatcher 702 and courier 704 fleets. Fleets consist of one or more compute instances, and they can be scaled independently. In embodiments, some or all of the compute instances (and therefore the compute instance capacity) used by the data transport service may be provided by the data transport service itself and/or some or all of the compute instances (the compute instance capacity) may be provided to the data transport service by another service of the provider network (e.g., a compute instance service that provides compute instance capacity to other services).

Channels

The transport layer is divided into individual channels. A channel is a logical construct that represents a static allocation of network and compute resources (e.g., network resource capacity and compute instance capacity) connecting a single source and destination. Channels have fixed capacities, which may be defined both in terms of bandwidth and TPS. The channel abstraction provides strong isolation and predictable performance by granting exclusive access to dedicated, fixed-capacity resources. Users (e.g., clients/customers) may purchase one or more channels according to their particular throughput and TPS requirements for a given source and destination pair.

Each channel is allocated an ingress queue 512a, an egress queue 512b, and a transport queue 706. Each channel is also allocated one or more dispatchers 702 (e.g., one or more compute instances respectively assigned as dispatchers) and one or more couriers 704 (e.g., one or more compute instances respectively assigned as dispatchers). At a high level, couriers are responsible for performing individual transfer tasks, while dispatchers are responsible for coordinating batches of tasks, potentially using multiple couriers.

Control Plane

The control plane provides an allocation service that is responsible for the creation, maintenance, and deletion of channels. Channels are allocated by assigning resources from the dispatch and courier fleets. The control plane ensures that physical resources are not oversubscribed, and it manages reallocations in the case of failures.

The control plane maintains a durable registry that includes an inventory of every dispatcher and courier in the fleet, along with a list of the currently allocated channels and their assigned resources. Each assignment includes the channel UUID, its total bandwidth and TPS ratings, the DNS names of its ingress, egress, and transport queues, the dispatchers and couriers that are allocated to it, and the couriers' individual bandwidth and TPS allocations.

A courier host may contain several couriers, each potentially assigned to different channels. The control plane ensures that hosts are not oversubscribed by taking care to limit the bandwidth allocated to each individual courier on a machine such that the sum of the allocations does not exceed the capabilities of the machine. The control plane thus needs to know what the expected throughput and TPS capabilities of each courier instances is. In some embodiments, a single courier instance may sustain about 50 MB/sec for large objects, and about 1400 TPS for zero-sized objects.

In addition to managing the creation and deletion of channels, the control plane may ensure that channels remain available in the event of failures. Each channel may be distributed across multiple availability zones, and failed instances may be replaced to ensure bandwidth guarantees are satisfied. The control plane may also help to minimize disruptions caused by the configuration/deployment process.

Couriers

Couriers are the fundamental unit of resource allocation in the transport layer. Conceptually, a courier may consist of a processor with a locally rate-limited network connection. Multiple couriers can be assigned to a single channel, and they can be distributed across one or more instances in the courier fleet.

Couriers are responsible for performing individual replication tasks. A replication task consists of copying a single object from source to destination using publicly available application programming interfaces (APIs). Replication tasks are delivered to couriers via the transport queue 706. Each courier long-polls its channel's transport queue, waiting for new task descriptors. Task descriptors include an object key (e.g., object identifier), an optional retry policy and deadline, and a return address to which the transfer result should be sent.

When a courier retrieves a task descriptor from the transport queue, it marks the task as in flight to prevent other couriers from attempting the same work. It performs the transfer, optionally retrying in the event of transient failures, and posts a response to the return address. Couriers may execute multiple transfers in parallel, so long as they do not exceed their allotted aggregate bandwidth. Couriers attempt to maximize both throughput and TPS by scheduling a combination of large and small objects at the same time.

Dispatchers

Dispatchers are responsible for driving replication batches to completion. They are implemented as threads running in the dispatcher fleet. Replication batches are delivered via the ingress queue. Each dispatcher long-polls its channel's ingress queue, waiting for a new batch descriptor. Batch descriptors include a UUID, a list of object keys, an optional retry policy and deadline, and a protocol.

When a dispatcher retrieves a batch descriptor from the ingress queue, it marks it as in flight to prevent other dispatchers from processing the same batch. It works through the batch by enqueuing one or more replication tasks on the transport queue and collecting the responses. Tasks that fail due to transient errors or timeouts may be re-enqueued, subject to the policy dictated by the batch descriptor. If no batch deadline is provided, transient errors may be retried indefinitely. Otherwise, when all tasks complete or the deadline expires, a result is written to the egress queue and the original batch descriptor is permanently removed from the ingress queue. The result includes the UUID of the original result along with error codes for any failed keys.

Protocols may allow users/customers to add business logic to the transport data path. For example, the data transport service can implement a protocol that validates the replication policy of an object before it is copied. In embodiments, a user can implement a protocol that re-encrypts objects before writing them to the destination. Protocols may be implemented by installing custom handlers that are invoked by couriers as they process tasks. Dispatchers additionally break multipart transfers into batches of single-part transfer tasks, allowing these objects to be transferred in parallel by all couriers assigned to the channel.

DC and AC Layers

In some embodiments, the data transport service may be split into two layers: the AC (admission control) layer and the DC (dispatchers/couriers) layer (e.g., the transport layer). AC provides routing and admission control of live replication traffic (e.g., live mutations of objects). DC provides a transport layer for copying objects across regions. Internal users of the provider network may interface directly with the DC layer by submitting batch copy requests. Conventional replication, on the other hand, is initiated by the AC layer, which consumes mutation notifications from a source (e.g., a data storage service) and submits copy requests to the DC layer on behalf of the user.

The DC Layer

The DC layer is split into cells. Each cell is administered separately (e.g., separate user accounts, data stores, etc.) to minimize blast radius in the event of operator/infrastructure error. Each cell contains four services: the Control Plane, Web Servers, Dispatchers, and Couriers, each of which has a presence in multiple availability zones (AZs) (two AZs in smaller regions). All components within a cell reside in the same virtual private cloud/network (VPC), which is fronted by a single public-facing load balancer. All DC resources assigned to a given channel reside within a single cell. The DC layer also includes a thin routing service consisting of Conveyors. This service leverages APIs and event-driven functions to route channel API calls to the appropriate DC cells.

Conveyers

The Conveyor service is split into cells, each with its own user account. Any conveyor cell can service requests to any channel. Every channel API call (except a "CreateChannel" call and a "ListChannels" call) operates on a single channel, identified by its network address. Conveyors route channel-specific requests to the DC cells hosting the specified channels using an in-memory cache of channel-to-cell mappings. They route CreateChannel requests to the least-loaded cell, and they forward ListChannel requests to all cells, coalescing the results. Cache misses and stale mappings (indicated by a special error code from cell web servers) are resolved by querying each DC cell in turn to determine whether it hosts the specified channel.

Each DC cell maintains a table recoding the channels it hosts. Conveyor caches can be reconstructed on startup or after a region failure in the same way that cache misses are resolved (namely, by querying DC cells for channel ownership). Conveyors forward requests using tokens obtained on behalf of the original callers. Consequently, requests issued to the conveyor are signed with a particular signing process (e.g., signature version 4).

Control Plane

Each DC cell includes a dedicated control plane. A cell control plane comprises three dedicated compute instances in an active/standby configuration, with a single leader elected via a service or algorithm. Every control plane instance can be queried to identify the current leader. All other channel API requests must be directed to the leader. The control plane exposes a create/read/update/delete (CRUD) API for managing the channels residing within its cell. Each channel is assigned a unique network address. The control plane maintains metadata for all channels hosted in the cell in a per-cell table. This metadata includes the user/owner and configured capacity of each channel. The control plane also exposes APIs to obtain a channel network address given its name, and to list all channels in the cell belonging to a given owner. The control plane leader provides a heartbeating service by which it monitors dispatcher and courier instances. On startup, dispatchers and couriers commence sending periodic heartbeat messages to the control plane leader.

Instances that fail to send a heartbeat within a designated interval are considered to be unavailable by the control plane. In its response to each heartbeat message, the leader specifies the channel each instance is currently assigned to. It also exposes an API to retrieve the list of all instances currently assigned to a given channel. The control plane API is only accessible via an internal load balancer. Ingress traffic is restricted to VPC-local IP addresses by both Security Groups and VPC access control lists (ACLs) to block requests originating outside the VPC.

Web Servers

Web servers provide the public-facing API to the DC layer and are fronted by an external load balancer. They are a thin proxy layer in front of the control plane and dispatcher services. Web servers authenticate customers (e.g., via sigv4 signed requests), and validate that calls are issued from whitelisted service principals (e.g., certain services and the data transport service) using context keys (thereby preventing end users from issuing requests directly against the web server load balancer). Finally, they authorize requests by validating that the user identity bound to the token corresponds to the channel owner specified in the metadata maintained by the control plane.

Web servers forward channel CRUD operations to the control plane leader. When servicing data plane requests (i.e., batch copy requests), they encrypt the customer's credentials (which grant the access to destinations needed for replication) using key management envelope encryption: the credentials are encrypted with a short-lived data key, which itself is encrypted with a per-cell key. The web server then forwards the data plane request, along with both the encrypted credentials and the encrypted data key, to any of the dispatchers assigned to the channel.

Dispatchers

Dispatchers provide a batch API for copying objects (e.g., from a data storage service). Each batch specifies the channel network address, keys for one or more objects to copy, and the location they should be copied to. Dispatchers validate that the supplied channel network address matches their current channel assignment as specified by the control plane (preventing the erroneous use of stale channel-to-dispatcher mappings). They then break the batch into individual tasks, which they distribute across all couriers assigned to the channel. Individual tasks are preformed asynchronously, and dispatchers signal completion to the original callers via SQS or HTTPS. Like the control plane, dispatchers are only accessible via an internal load balancer, with ingress traffic restricted by both Security Groups and ACLs.

Couriers

Couriers are responsible for copying individual objects. As with dispatchers, they are assigned to specific channels by the control plane. They query the control plane for the list of dispatchers assigned to their channels and poll these dispatchers directly via HTTP to retrieve individual tasks. Couriers decrypt the users FAS credentials using the per-cell CMK, and use these credentials to gain access to the caller's S3 buckets. They read objects from the source region, write them to the destination region, and signal completion to the dispatchers from which they retrieved the tasks via HTTP.

The AC Layer

Like the DC layer, the AC layer is split into multi-AZ cells, each with its own user account. AC cells contain three services: the Control Plane, Routers, and Admission Controllers; all services in a single cell reside within the same VPC, and all resources dedicated to a single channel reside within the same cell. Each cell is fronted by a public-facing load balancer.

The AC layer exposes no public-facing API. Instead, it consumes a stream of events generated by the Reliable Event Generator (REG). Each event specifies a single object mutation event (e.g., PUT, ACL, Tags, etc.). These events are delivered via one or more common SQS queues.

Control Plane

The AC control plane is similar to the DC control plane. It may consist of multiple instances in an active/standby configuration with a single leader elected via a service or algorithm. The leader exposes a heartbeating service to monitor admission control instances and assign them to channels.

Routers

Routers in the AC layer read object mutation events from the common SQS queues and forward them to channel-specific SQS queues. They perform this routing by: 1) matching object keys/prefixes/tags to replication policies 2) matching replication policies to channel network addresses, and 3) identifying the channel-specific SQS queue associated with channels via a fixed naming convention. Routers are not assigned to specific channels and instead route traffic for all channels.

Admission Controllers

The control plane assigns each channel a dedicated set of Admission Control instances via the same heartbeating mechanism described above. Admission controllers read events from their per-channel SQS queues, sort them by destination, and submit them in batches to the Transport Layer via an API. All tasks in a batch must correspond to the same replication policy. The policy configuration specifies an identity/access role that can be assumed to gain access to the destinations covered by the replication policy. Admission controllers assume this role before submitting batches to the Transport Layer.

Admission controllers include the network address of their cell load balancer in each batch they submit. Dispatchers return replies over HTTPS to these load balancers; host and/or path based routing in the load balancer is used to route the response back to the specific admission controller that originally submitted the batch. Admission controllers are responsible for retrying failed batches and throttling customer traffic if necessary. They use the channel-specific SQS queues to durably store mutation events until the objects have been successfully replicated.

In embodiments, the data transport service improves/optimizes the utilization of the compute instance capacity by having each courier (e.g., compute instance) of a fleet of couriers assigned to a channel implement a task selection algorithm. As describe below, the algorithm may result in a more efficient distribution of replication tasks across the couriers of the fleet and improve the usage/efficiency of the compute instance capacity reserved for each channel (e.g., in terms of bandwidth and TPS utilization). As discussed herein, a courier assigned to a channel (e.g., a compute instance) may be assigned to a particular dispatcher (e.g., another compute instance) and receives tasks to replicate objects from the dispatcher. In embodiments, the courier may poll the dispatcher (e.g., at periodic intervals and/or at other times) to request additional tasks (to replicate objects). In some embodiments, the courier may be assigned (e.g., by the data transport service) limits for TPS (e.g., 500 TPS or objects per second) and/or bandwidth (e.g., 50 megabytes per second). Thus, the channel may be limited at performing up to 500 TPS and upt to 50 MB/sec.

In various embodiments, a series of small objects (e.g., zero byte size or smaller sizes such as 1 kilobyte) may be replicated at a relatively higher TPS but at a relatively lower bandwidth, whereas larger objects (e.g., 5 gigabytes) may be replicated at a relatively lower TPS but at a relatively higher bandwidth. In embodiments, the courier's pending task queue is monitored (e.g., by the courier). In embodiments, each courier has mutually exclusive access to its own queue of objects in its transport queue (e.g., with respect to other couriers). However, in some embodiments, the courier may instruct its dispatcher to re-assign an object to another courier's queue to better utilize its assigned TPS or bandwidth.

As mentioned above, each courier may implement its own task selection algorithm. Pending tasks for a given courier are monitored by the courier. The algorithm may cause larger objects to be re-assigned to other couriers of the channel (or other channels) as needed in order to distribute them more evenly among the fleet of couriers (allowing larger objects to be replicated in parallel, using more of the unused bandwidth for each courier). The algorithm may also cause smaller objects to be re-assigned to other couriers of the channel (or other channels) as needed in order to distribute them more evenly across the fleet of couriers (allowing more of the unused TPS to be used for each courier).

As described above, the couriers may perform the majority or all of the load management for a channel. For example, a given courier may instruct its dispatcher to send to it (e.g., via its transport queue) more larger sized objects for replication or to send to it more smaller sized objects for replication, depending on how much of its allocated bandwidth and TPS capability is available (e.g., not currently being used). For example, if there is much more unused bandwidth than unused TPS, then the courier may instruct the dispatcher to provide more of the larger-sized objects. By selecting one or more larger-sized objects (e.g., sufficiently large enough in size) to be replicated, the rate of transmitting the data (e.g., bandwidth to transmit the object's data) from the courier to the other infrastructure may be increased.

Conversely, if there is much more unused TPS than unused bandwidth, the courier may instruct the dispatcher to provide more of the smaller-sized objects. By selecting one or more smaller-sized objects (e.g., sufficiently small enough in size) to be replicated, the rate of transmitting objects (e.g., TPS or rate of transmitting transactions) from the courier to the other infrastructure may be increased. Thus, a courier may provide feedback to its dispatcher on a periodic basis in order to maximize its use of bandwidth and TPS (e.g., use a larger percentage of the maximum allocated bandwidth and TPS) by using the task selection algorithm.

Figure 8:
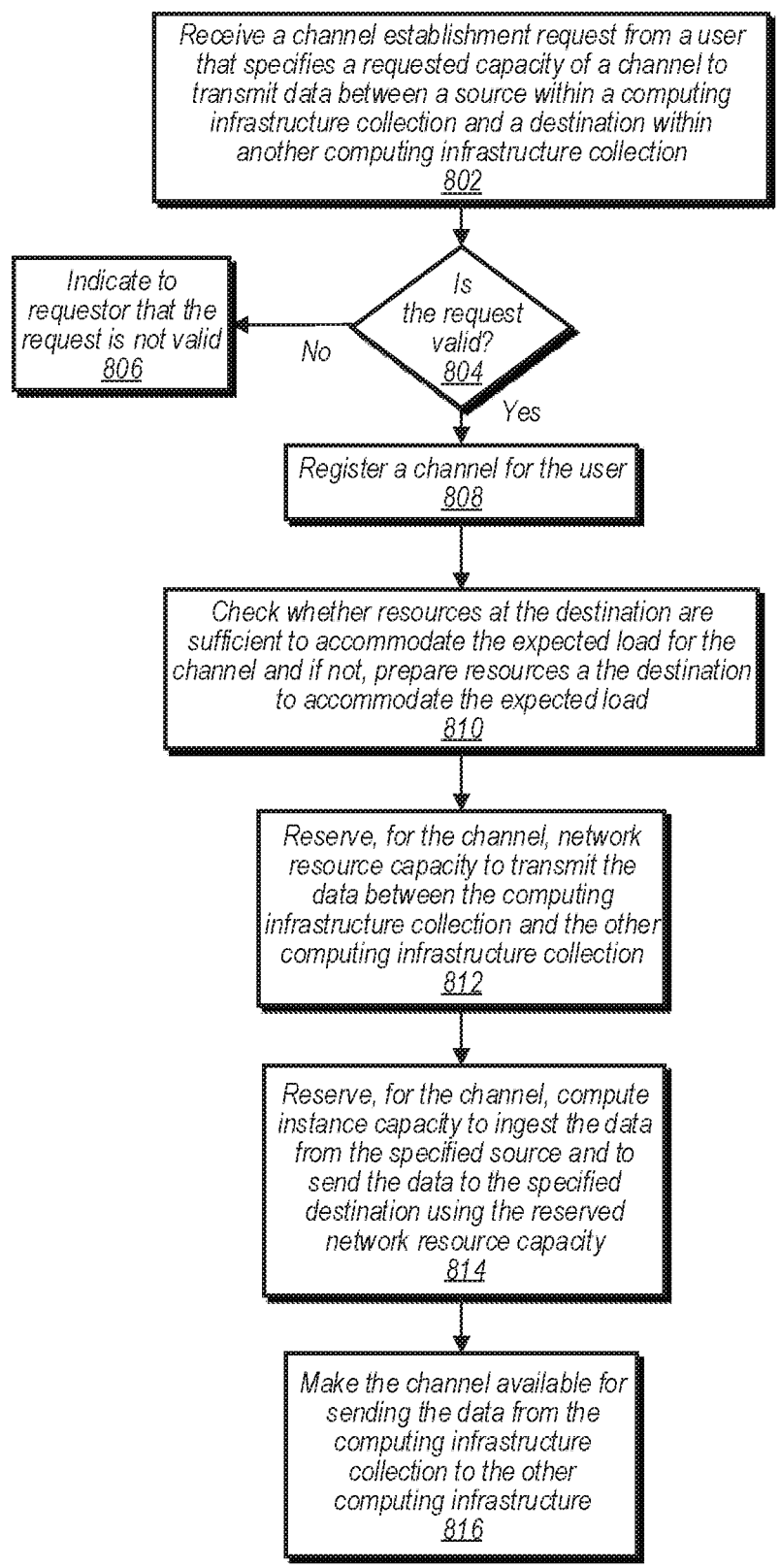
FIG. 8 is a flow diagram that illustrates configuring a channel of a data transport service, according to some embodiments.

FIG. 8 is a flow diagram that illustrates configuring a channel of a data transport service, according to some embodiments. At block 802, the data transport service receives, from a user, a channel establishment request that specifies a requested capacity of a channel to transmit data between a source within an infrastructure and a destination within another infrastructure.

At block 804, the data transport service determines whether the request is valid. If not, then at block 806, the data transport service indicates to the request that the request is invalid. In embodiments, the data transport service may determine that a request is not valid if the request fails user authentication or if the request specifies a capacity that is not available for a channel.

If the request is valid, then at block 808, the data transport service registers a channel for the user. At block 810, the data transport service performs a check to determine whether network resource capacity and/or compute instance capacity at the destination (e.g., at an instance of the data transport service at the destination infrastructure) are sufficient to accommodate the expected load (e.g., amount of data/traffic) for the registered channel. If so, then no additional resources may be need to be reserved. If not, then the data transport service at the destination region (and/or source region) may reserve a sufficient amount of network resource capacity and/or compute instance capacity to accommodate the expected load.

At block 812, the data transport service reserves, for the channel, network resource capacity to transmit the data between the infrastructure and the other infrastructure. At block 814, the data transport service reserves, for the channel, compute instance capacity to ingest the data from source and to send the data to the specified destination using the reserved network resource capacity. At block 816, the data transport service makes the channel available for sending the data from the infrastructure to the other infrastructure. The data transport service may send a message to the requestor that indicates the channel is available for sending data.

Figure 9:
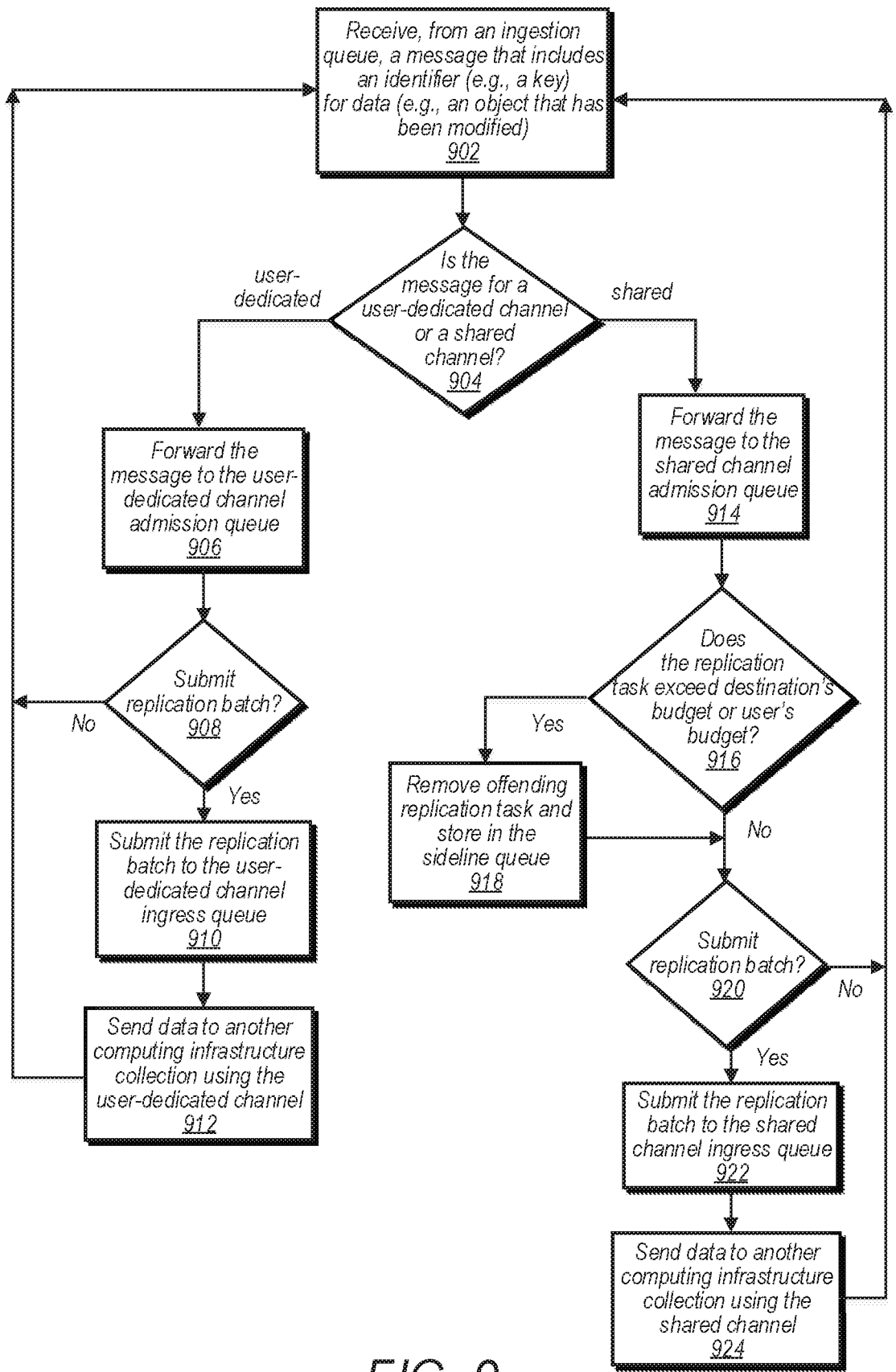
FIG. 9 is a flow diagram that illustrates processing batches and sending data between computing infrastructure collections using a dedicated channel or a shared channel, according to some embodiments.

FIG. 9 is a flow diagram that illustrates processing batches and sending data between computing infrastructure collections using a dedicated channel or a shared channel, according to some embodiments. At block 902, the data transport service receives, from an ingestion queue, a message that indicates an identifier (e.g., a key) for data (e.g., an object that has been modified at a source).

At block 904, the data transport service determines if the message is for a user-dedicated channel or a shared channel. If the message is for a user-dedicated channel, then at block 906, the data transport service forwards the message to the admission queue for the user-dedicated channel. At block 908, the data transport service determines whether to submit a replication batch to the user-dedicated channel. If not, then the data transport service may return to block 902 to receive additional messages for the user-dedicated channel before submitted a batch. If a threshold number of messages has been received, then at block 910, the data transport service submits the replication batch to the ingress queue for the user-dedicated channel. At block 912, the user-dedicated channel sends the data (e.g., replicates the object) to another infrastructure using the user-dedicated channel.

Returning to block 904, if the message is for a shared channel, then at block 914, the data transport service forwards the message to the admission queue for the shared channel. At block 916, the data transport service determines whether the replication task exceeds a budget allotted to the destination that the object is to be replicated to and/or whether the replication task exceeds a budget allotted to a user that the object is to be replicated for. If so, then at block 918, the data transport service removes the replication task and stores it in a sideline queue for later processing (e.g., to avoid exceeding aggregate capacity limits for the shared channel and/or to prevent the user from exceeding a threshold capacity assigned to the user by enforcing a fairness algorithm, as discussed above). If not, then at block 920, the data transport service determines whether to submit a replication batch to the shared channel. If not, then the data transport service may return to block 902 to receive additional messages for the shared channel before submitted a batch.

If a threshold number of messages has been received, then at block 922, the data transport service submits the replication batch to the ingress queue for the shared channel. At block 924, the shared channel sends the data (e.g., replicates the object) to another infrastructure using the shared channel.

Figure 10:
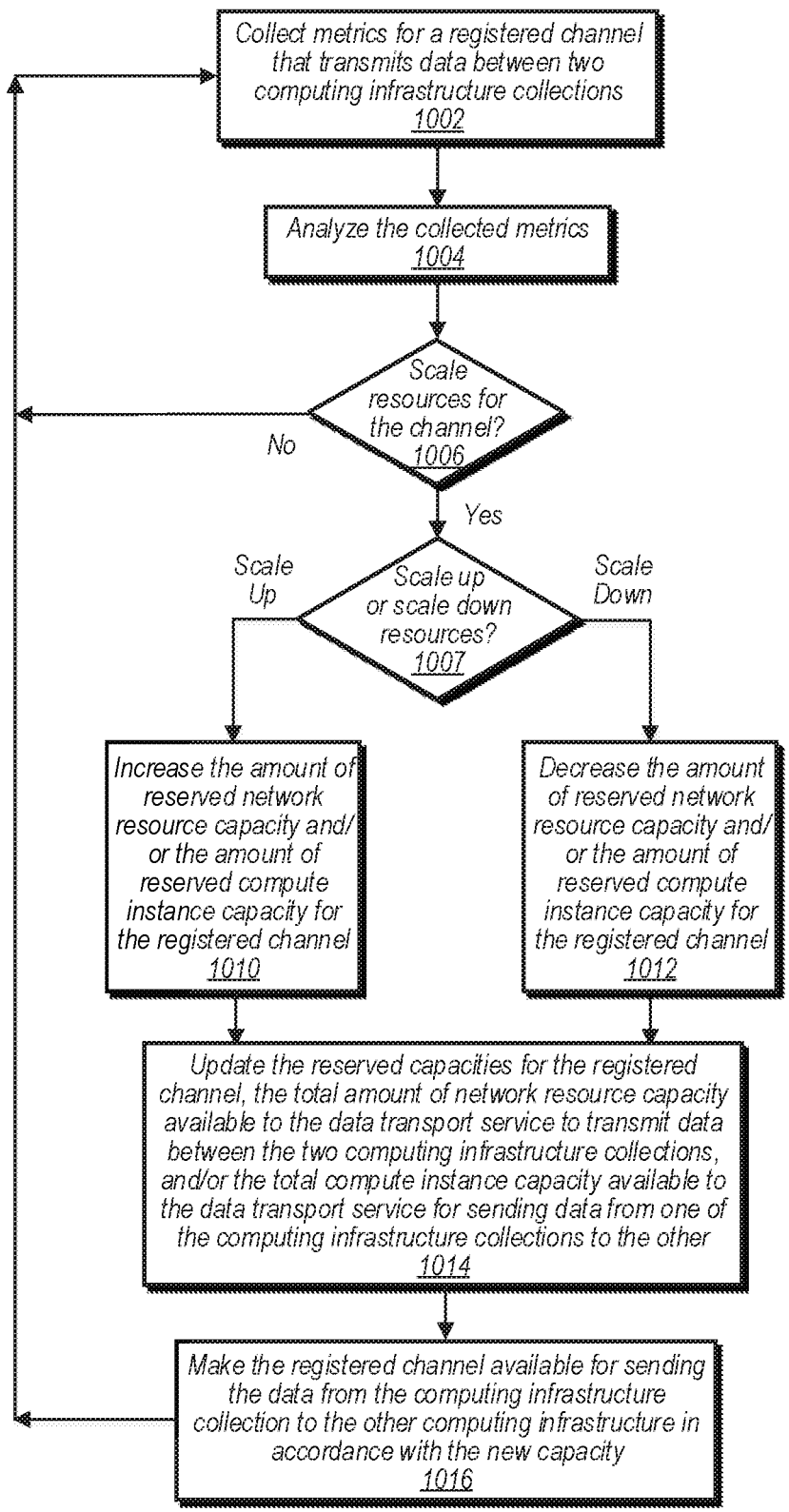
FIG. 10 is a flow diagram that illustrates scaling the capacity of a channel and updating the total amount of available network resource capacity and compute instance capacity for the data transport service, according to some embodiments.

FIG. 10 is a flow diagram that illustrates scaling the capacity of a channel and updating the total amount of available network resource capacity and compute instance capacity for the data transport service, according to some embodiments. At block 1002, the data transport service collects metrics for a registered channel (e.g., a user-dedicated channel or shared channel) that transmits data between two infrastructures.

At block 1004, the data transport service analyzes the collected metrics. At block 1006, the data transport service determines, based on the analysis, whether to scale resources for the channel. If not, then the process returns to block 1002. If so, the process advances to block 1008. In embodiments, the analysis may include determining, based on an increase in an amount of data transmitted using the channel over a period of time, that resources are to be scaled up by a certain amount. Conversely, the analysis may include determining, based on a decrease in an amount of data transmitted using the channel over a period of time, that resources are to be scaled down by a certain amount. In embodiments, the analysis includes identifying one or more patterns corresponding to the collected metrics (e.g., patterns in an amount of data transmission over a period of time identified in the collected metrics) and based on the identified patterns, predicting an amount of the data to be transmitted during a future time period using the channel. Based on the predicted amount of data, the data transport service may scale the resources up or down by a certain amount (e.g., scaled up for a predicted increase in the amount of data, scaled down for a predicted decrease).

At block 1008, if the data transport service determines to scale resource up, then at block 1010, the data transport service increases the amount of reserved network capacity and/or the amount of reserved compute instance capacity for the registered channel. This may occur if the data transport service determines that additional capacity is needed to support increased traffic at the channel (e.g., based on recent traffic or predicted traffic).

Returning to block 1008, if the data transport service determines to scale resource down, then at block 1012, the data transport service decreases the amount of reserved network capacity and/or the amount of reserved compute instance capacity for the registered channel. This may occur if the data transport service determines that less capacity is needed to support reduced traffic at the channel (e.g., based on recent traffic or predicted traffic). After either block 1010 or block 1012, the process advances to block 1014, where the data transport service updates the reserved capacities for the registered channel, the total amount of network resource capacity available to the data transport service to transmit data between the infrastructures, and/or the total amount of compute instance capacity available to the data transport service for sending data from one infrastructure to the other.

At block 1016, the data transport service makes the registered channel available for sending data from one infrastructure to the other in accordance with the new capacity (e.g., the updated capacity due to the changes in reserved network resource capacity and/or compute instance capacity for the channel). The process then returns to block 1002, where the data transport service continues to collect metrics for the channel. Thus, the data transport service may adjust resources for the channel on a periodic basis or any number of times, based on the amount of capacity being used or the predicted amount capacity to be used for the channel.

In various embodiments, resources for the channel may be scaled up or down based on other factors. For example, the data transport service may receive (e.g., from a user) a deadline for an amount of data to be transmitted from a source within an infrastructure to a destination within another infrastructure. Based on the deadline to transmit the amount of data, the data transport service may increase the network capacity resources and/or compute instance capacity resources assigned to the channel in order to provide a sufficient amount of resources to satisfy the deadline to transfer the amount of data. When this occurs, the resources for one or more other channels may be scaled down to free up the network capacity resources and/or compute instance capacity for reservation/use by the channel to transmit the amount of data by the deadline. In some cases, based on the deadline to transmit the amount of data, the data transport service may decrease the network capacity resources and/or compute instance capacity resources assigned to the channel (e.g., if the deadline is far enough into the future, such that a smaller amount of resources is needed by the channel to meet the deadline to transmit the data).

Any of various computer systems may be configured to implement processes associated with the data transport service, other services of the provider network, computing infrastructure collections, clients, or any other component of the above figures. For example, FIG. 11 is a block diagram illustrating an example computer system that implements some or all of the techniques described herein, according to some embodiments.

Figure 11:
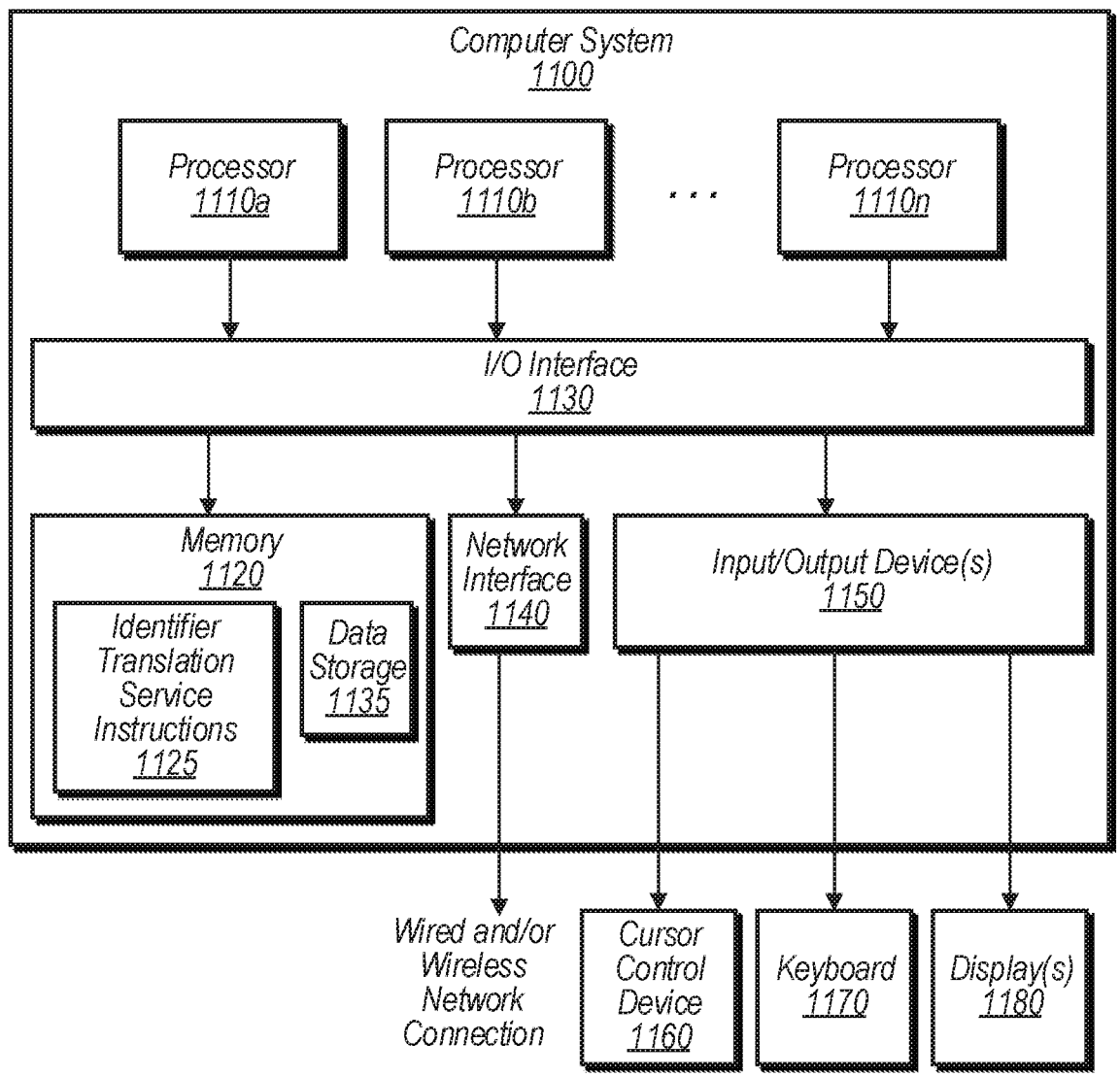
FIG. 11 is a block diagram illustrating an example computer system that implements some or all of the techniques described herein, according to some embodiments.

In various embodiments, the data transport service, other services of the provider network, computing infrastructure collections, clients, or any other component of any of FIGS. 1-10 may each include one or more computer systems 1100 such as that illustrated in FIG. 11. In embodiments, the data transport service, other services of the provider network, computing infrastructure collections, clients, or any other component may include one or more components of the computer system 1100 that function in a same or similar way as described for the computer system 1100.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be embedded processors implementing any of a variety of instruction set architectures (ISAs), such as the x106, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the data transport service, are shown stored within system memory 1120 as data transport service program instructions 1125. In some embodiments, system memory 1120 may include data 1135 which may be configured as described herein.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other computer systems 1100 or devices attached to a network, such as the local network discussed above, a wide-area network, or a local network within the provider network, for example. In particular, network interface 1140 may be configured to allow communication between computer system 1100 and/or various I/O devices 1150. I/O devices 1150 may include scanning devices, display devices, input devices and/or other communication devices, as described herein. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In some embodiments, I/O devices 1150 may be relatively simple or "thin" client devices. For example, I/O devices 1150 may be configured as dumb terminals with display, data entry and communications capabilities, but otherwise little computational functionality. However, in some embodiments, I/O devices 1150 may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices 1150 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1150 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device 1150 (e.g., cursor control device 1160, keyboard 1170, or display(s) 1170 may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transport service, other services, computing infrastructure collections, and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices of a provider network comprising respective processors and memory to implement a data transport service to:
  receive a plurality of respective requests from different users for assignment of respective channels for transmission of respective data between a respective source and a respective destination, wherein the respective source is within a first computing infrastructure collection of the provider network and the respective destination is within a second computing infrastructure collection of the provider network, and wherein individual ones of the plurality of respective requests specify:
    a requested capacity of the channel to transmit data between a specified source in the first computing infrastructure collection and a specified destination in the second computing infrastructure collection; and
  for a particular request of the plurality of respective requests, assign a particular channel, and based on the requested capacity for the particular channel:
    reserve, for the particular channel, network resource capacity to transmit the data between the first computing infrastructure collection and the second computing infrastructure collection, wherein the reserved network resource capacity is at least a portion of a total amount of network resource capacity available to the data transport service to transmit data between the first computing infrastructure collection and the second computing infrastructure collection;
    reserve, for the particular channel, compute instance capacity to ingest the data from the specified source and to send the data to the specified destination using the reserved network resource capacity, wherein the reserved compute instance capacity is at least a portion of a total compute instance capacity available to the data transport service for sending data from the first computing infrastructure collection to the second computing infrastructure collection or other computing infrastructure collections;

wherein the reserved network resource capacity and reserved compute instance capacity are dedicated to the particular channel; and send the data from the first computing infrastructure collection to the second computing infrastructure collection using the particular channel.

2. The system as recited in claim 1, wherein the one or more computing devices are configured to implement the data transport service to:

collect metrics for the transmission of the data using the particular channel;

analyze the collected metrics; and in response to the analysis of the collected metrics, perform one or more of:

adjust an amount of the reserved network resource capacity for the particular channel, or adjust an amount of the reserved compute instance capacity for the particular channel.

3. The system as recited in claim 1, wherein:

to assign the particular channel, the one or more computing devices are configured to implement the data transport service to dedicate the particular channel for use by a data storage service of the provider network, and wherein to send the data using the particular channel, the one or more computing devices are configured to implement the data transport service to use the particular channel to isolate performance of data transfers between a first instance of the data storage service at the first computing infrastructure collection and a second instance of the data storage service at the second computing infrastructure collection from performance of other data transfers between the first and second computing infrastructure collections of other services of the provider network.

4. The system as recited in claim 3, wherein:

to dedicate the particular channel for use by the data storage service, the one or more computing devices are configured to implement the data transport service to dedicate the particular channel for use by an external client of the data storage service of the provider network, and wherein to send the data using the particular channel, the one or more computing devices are configured to implement the data transport service to use the particular channel to isolate performance of data transfers for the external client between the first instance at the first computing infrastructure collection and the second instance at the second computing infrastructure collection from performance of data transfers of other external clients of the data storage service between the first instance at the first computing infrastructure collection and the second instance at the second computing infrastructure collection.

5. The system as recited in claim 1, wherein the one or more computing devices are configured to implement the data transport service to:

receive, from an ingestion queue, a message comprising an identifier for an object to be replicated from a source within the first computing infrastructure collection to a destination within the second computing infrastructure collection;

in response to a determination that the object is to be replicated using a shared channel of the data transport service, forward the message to an admission queue for the shared channel, wherein the shared channel is available for use by a plurality of users of the data transport service to transmit data between the first computing infrastructure collection and the second computing infrastructure collection, and wherein the shared channel uses a portion of the total amount of the network resource capacity and the compute instance capacity that is not reserved for the particular channel and other ones of the respective channels;

in response to a determination that a utilization of the shared channel to send the object to the destination is within a threshold amount of utilization, include the message within a batch of a plurality of messages for the shared channel;

submit the batch of messages to the shared channel; and send the object from the first computing infrastructure collection to the second computing infrastructure collection using the shared channel.

6. A method, comprising:

performing, by one or more computing devices of a data transport service of a provider network:

assigning respective channels for use by respective users, wherein a respective source, destination, and capacity to transmit data are associated with individual ones of the respective channels, and wherein the respective source is within a first computing infrastructure collection of the provider network and the respective destination is within a second computing infrastructure collection of the provider network; and for a particular channel of the respective channels, based on the capacity associated with the particular channel:

reserving, for the particular channel, network resource capacity to transmit the data between the first and second computing infrastructure collections, wherein the reserved network resource capacity is at least a portion of a total amount of network resource capacity available to the data transport service to transmit data between the first and second computing infrastructure collections;

reserving, for the particular channel, compute instance capacity to send the data to the specified destination using the reserved network resource capacity, wherein the reserved compute instance capacity is at least a portion of a total compute instance capacity available to the data transport service for sending data from the first computing infrastructure collection to the second computing infrastructure collection or other computing infrastructure collections;

wherein the reserved network resource capacity and reserved compute instance capacity are dedicated to the particular channel; and sending the data from the first computing infrastructure collection to the second computing infrastructure collection using the particular channel.

7. The method as recited in claim 6, further comprising:

collecting metrics for the transmission of the data using the particular channel;

analyzing the collected metrics; and in response to the analysis of the collected metrics, performing one or more of:

adjusting an amount of the reserved network resource capacity for the particular channel, or adjusting an amount of the reserved compute instance capacity for the particular channel.

8. The method as recited in claim 7, further comprising:
identifying one or more patterns corresponding to the collected metrics;
based on the identified patterns, predicting an amount of the data to be transmitted during a future time period using the particular channel; and
determining, based on the predicted amount of the data to be transmitted, one or more of:
the adjustment of the amount of the reserved network resource capacity for the particular channel, or
the adjustment of the amount of the reserved compute instance capacity for the particular channel.

9. The method as recited in claim 7, further comprising updating metadata for the data transport service based on one or more of the adjusted amount of the network resource capacity or the adjusted amount of the reserved compute instance capacity, the metadata specifying one or more of:
an amount of network resource capacity currently reserved for the particular channel;
an amount of compute instance capacity currently reserved for the particular channel;
the total amount of network resource capacity currently available for reservation by other channels of the respective channels; and
the total amount of compute instance capacity currently available for reservation by other channels of the respective channels.

10. The method as recited in claim 6, further comprising:
receiving, from a user of the respective users, an indication of the capacity to be associated with the particular channel, wherein the capacity comprises one or more of:
an amount of time between when data is written to the first computing infrastructure collection and when the data is copied to the second computing infrastructure collection,
a rate of transmitting data from the first computing infrastructure collection to the second computing infrastructure collection, or
a rate of transmitting transactions from the first computing infrastructure collection to the second computing infrastructure collection; and
associating the indicated capacity with the particular channel.

11. The method as recited in claim 6, further comprising:
dedicating the particular channel for use by another service of the provider network, wherein performance of data transfers between a first instance of the other service at the first computing infrastructure collection and a second instance of the other service at the second computing infrastructure collection is isolated from performance of other data transfers between first and second computing infrastructure collections of additional services of the provider network.

12. The method as recited in claim 5, wherein the reserved compute instance capacity comprises a fleet of compute instances assigned to send objects to the second computing infrastructure collection, and wherein the sending the data from the first computing infrastructure collection to the second computing infrastructure collection using the particular channel comprises:
implementing, by at least one of the compute instances, a task selection algorithm, wherein the implementing comprises:
selecting one or more objects to be replicated by the at least one compute instance that are large enough in size such that a rate of transmitting the data from the at least one compute instance to the second computing infrastructure collection is increased, or
selecting one or more objects to be replicated by the at least one compute instance that are small enough in size such that a rate of transmitting objects from the at least one compute instance to the second computing infrastructure collection is increased.

13. The method as recited in claim 6, further comprising:
receiving a message comprising an identifier for a portion of data to be replicated from a source within the first computing infrastructure collection to a destination within the second computing infrastructure collection;
in response to a determination that the portion of data is to be replicated using a shared channel of the data transport service, forwarding the message to an admission queue for the shared channel, wherein the shared channel is available for use by a plurality of users of the data transport service to transmit data between the first computing infrastructure collection and the second computing infrastructure collection, and wherein the shared channel uses a portion of the total amount of the network resource capacity and the compute instance capacity that is not reserved for the particular channel and other ones of the respective channels; and
sending the portion of data from the first computing infrastructure collection to the second computing infrastructure collection using the shared channel.

14. One or more non-transitory computer-accessible storage media storing program instructions that when executed on or across one or more processors:
assign respective channels for use by respective users of a data transport service of a provider network, wherein a respective source, destination, and capacity to transmit data are associated with individual ones of the respective channels, and wherein the respective source is within a first computing infrastructure collection of the provider network and the respective destination is within a second computing infrastructure collection of the provider network;
for a particular channel of the respective channels, based on the capacity associated with the particular channel:
reserve, for the particular channel, network resource capacity to transmit the data between the first and second computing infrastructure collections, wherein the reserved network resource capacity is at least a portion of a total amount of network resource capacity available to the data transport service to transmit data between the first and second computing infrastructure collections;
reserve, for the particular channel, compute instance capacity to send the data to the specified destination using the reserved network resource capacity; and
wherein the reserved network resource capacity and reserved compute instance capacity are dedicated to the particular channel;
receive a message comprising an identifier for a portion of data to be replicated from a source within the first computing infrastructure collection to a destination within the second computing infrastructure collection;
in response to a determination that the portion of data is to be replicated using the particular channel, forward the message to an admission queue for the particular channel; and
send the portion of data from the first computing infrastructure collection to the second computing infrastructure collection using the particular channel.

15. The one or more storage media as recited in claim 14, further comprising program instructions that when executed on or across the one or more processors further cause the one or more processors to:
- collect metrics for the transmission of the data using the particular channel;
- analyze the collected metrics; and
- in response to the analysis of the collected metrics, perform one or more of:
  - adjust an amount of the reserved network resource capacity for the particular channel, or
  - adjust an amount of the reserved compute instance capacity for the particular channel.

16. The one or more storage media as recited in claim 15, further comprising program instructions that when executed on or across the one or more processors further cause the one or more processors to:
- identify one or more patterns corresponding to the collected metrics;
- based on the identified patterns, predict an amount of the data to be transmitted during a future time period using the particular channel; and
- determine, based on the predicted amount of the data to be transmitted, one or more of:
  - the adjustment of the amount of the reserved network resource capacity for the particular channel, or
  - the adjustment of the amount of the reserved compute instance capacity for the particular channel.

17. The one or more storage media as recited in claim 14, further comprising program instructions that when executed on or across the one or more processors further cause the one or more processors to:
- receive a deadline for an amount of data to be transmitted from the source within the first computing infrastructure collection to the destination within the second computing infrastructure collection using the particular channel; and
- in response to receiving the deadline, perform one or more of:
  - adjust an amount of the reserved network resource capacity for the particular channel, or
  - adjust an amount of the reserved compute instance capacity for the particular channel.

18. The one or more storage media as recited in claim 14, further comprising program instructions that when executed on or across the one or more processors further cause the one or more processors to:
- receive another message comprising an identifier for another portion of data to be replicated from another source within the first computing infrastructure collection to another destination within the second computing infrastructure collection;
- in response to a determination that the other portion of data is to be replicated using a shared channel of the data transport service, forward the message to an admission queue for the shared channel, wherein the shared channel is available for use by a plurality of users of the data transport service to transmit data between the first computing infrastructure collection and the second computing infrastructure collection, and wherein the shared channel uses a portion of the total amount of the network resource capacity and compute instance capacity that is not reserved for the particular channel and other ones of the respective channels; and
- send the other portion of data from the first computing infrastructure collection to the second computing infrastructure collection using the shared channel.

19. The one or more storage media as recited in claim 14, further comprising program instructions that when executed on or across the one or more processors further cause the one or more processors to:
- dedicate the particular channel for use by another service of the provider network, wherein performance of data transfers between a first instance of the other service at the first computing infrastructure collection and a second instance of the other service at the second computing infrastructure collection is isolated from performance of other data transfers between first and second computing infrastructure collections of additional services of the provider network.

20. The one or more storage media as recited in claim 19, wherein to dedicate the particular channel for use by the other service of the provider network, the program instructions when executed on or across the one or more processors cause the one or more processors to:
- dedicate the particular channel for use by an external client of the other service of the provider network, wherein performance of data transfers for the external client between the first instance at the first computing infrastructure collection and the second instance at the second computing infrastructure collection is isolated from performance of other data transfers of other external clients of the other service between the first instance at the first computing infrastructure collection and the second instance at the second computing infrastructure collection.

* * * * *